(12) United States Patent
Itoh

(10) Patent No.: US 8,414,134 B2
(45) Date of Patent: Apr. 9, 2013

(54) ILLUMINATION APPARATUS AND PROJECTOR

(75) Inventor: Yoshitaka Itoh, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 316 days.

(21) Appl. No.: 12/645,180

(22) Filed: Dec. 22, 2009

(65) Prior Publication Data

US 2010/0157252 A1 Jun. 24, 2010

(30) Foreign Application Priority Data

Dec. 24, 2008 (JP) ................................. 2008-326788
Nov. 11, 2009 (JP) ................................. 2009-258186

(51) Int. Cl.
*G03B 21/28* (2006.01)

(52) U.S. Cl.
USPC ................... 353/99; 353/30; 353/31; 353/38; 353/51; 353/98; 353/122; 362/227; 362/234

(58) Field of Classification Search ................... 353/30, 353/31, 38, 51, 81, 98, 99, 122; 362/227, 362/234, 236, 241; 348/262, 265, 336, 337, 348/338, 339; 349/5, 7.8, 9
See application file for complete search history.

(56) References Cited

U.S. PATENT DOCUMENTS

| | | | |
|---|---|---|---|
| 6,196,699 B1 * | 3/2001 | Stanton | 362/235 |
| 6,517,212 B2 * | 2/2003 | Satou | 353/99 |
| 6,549,338 B1 * | 4/2003 | Wolverton et al. | 359/634 |
| 6,698,893 B2 * | 3/2004 | Takimoto et al. | 353/31 |
| 6,924,849 B1 * | 8/2005 | Clifton et al. | 349/5 |
| 7,182,468 B1 * | 2/2007 | Haven | 353/94 |
| 7,222,975 B2 * | 5/2007 | Lin | 353/94 |
| 2004/0070970 A1 * | 4/2004 | Chang | 362/234 |
| 2006/0164600 A1 * | 7/2006 | Morejon et al. | 353/31 |
| 2006/0198139 A1 * | 9/2006 | Cheng | 362/241 |
| 2007/0165185 A1 * | 7/2007 | Chen | 353/20 |
| 2007/0297173 A1 * | 12/2007 | Wang | 362/241 |
| 2008/0247164 A1 * | 10/2008 | Lee et al. | 362/241 |

FOREIGN PATENT DOCUMENTS

| | | |
|---|---|---|
| JP | 2003-255466 A | 10/2003 |
| JP | 3581568 B2 | 10/2004 |
| WO | 2004/034142 A1 | 4/2004 |

* cited by examiner

*Primary Examiner* — Georgia Y Epps
*Assistant Examiner* — Sultan Chowdhury
(74) *Attorney, Agent, or Firm* — Maschoff Brennan

(57) ABSTRACT

An illumination apparatus includes first and second light source units. An optical axis converting element has a first surface that reflects a luminous flux emitted from the first light source unit and a second surface that reflects a luminous flux emitted from the second light source unit and is configured to reflect respective luminous fluxes emitted from the respective light source units in substantially one direction. Each of the luminous fluxes entering the optical axis converting element has different dimensions in two directions orthogonal to each other in a plane orthogonal to an emission axis of the each light source unit. The optical axis converting element is arranged such that a cross-sectional shape of the luminous flux entering each optical axis converting element taken along the surface has a short side direction in the same direction as the direction of arrangement of the first and second surfaces.

18 Claims, 22 Drawing Sheets

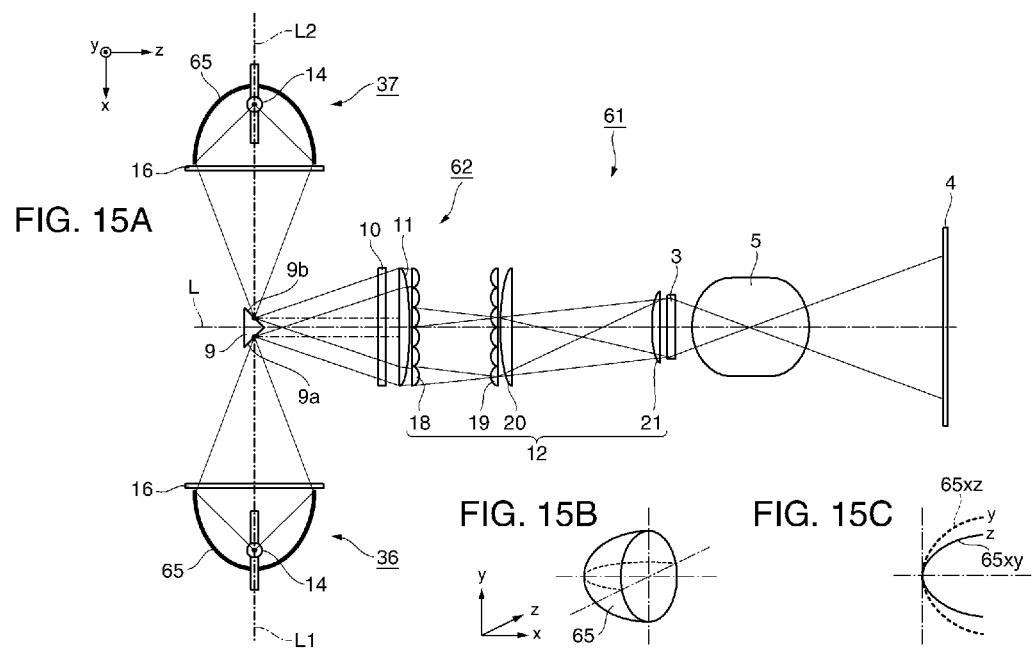

ILLUMINATION APPARATUS AND PROJECTOR

BACKGROUND

1. Technical Fields

The present invention relates to an illumination apparatus configured to illuminate, for example, a light-modulating element, and a projector configured to project and display an optical image formed on an image forming element on a screen by a projection lens and, more specifically, to a configuration of an illumination apparatus having a plurality of light source units.

2. Related Art

As one of apparatuses which are capable of displaying a large-screen video, a projector configured to illuminate a small-sized image forming element which forms an optical image according to video data by a light from an illumination apparatus and display the optical image on the screen or the like by a projection lens has become commercially practical. In the projector of a type described above, upsizing of a screen, increase in luminance, and reduction of luminance nonuniformity or color nonuniformity in a projected image is strongly required, and a high-performance illumination optical system for realizing these requirements has now been in development.

In order to achieve increase in luminance of the projected image, a projector having a plurality of light source units (light source lamps) has become commercially practical. For example, in an illumination apparatus (see FIG. 1 in Japanese Patent No. 3581568 (Patent Document 1)) of a projection-type display apparatus (projector) disclosed in Patent Document 1 shown below, lights from two light source lamps are condensed by respective oval reflectors, and reflected by reflecting surfaces of a reflection prism arranged at a condensed position in the direction toward an integrator to form a combined light which is emitted in substantially one direction, so that increase in quantity of emitted light is achieved. The lights emitted from the optical source lamps are condensed with a smallest luminous flux diameter at a second focal point of the oval reflector, and a light source image is formed on the reflecting surfaces of the reflection prism. In this configuration, positions of the two light source images formed on the reflection prism is closer to an illumination optical axis than the actual position of the light source lamps, and hence it is equivalent to an arrangement of the two optical source lamps close to the illumination optical axis. Therefore, a light including two lights from the two light source lamps combined substantially into one can be generated while restraining a divergence of the angular distribution in the illuminating light.

Here, since most of optical elements such as the image forming element, the polarizing element, and the projection lens have an angle dependency with respect to an incident light as optical characteristics, a combined light having both a small luminous flux diameter and a narrow divergence of the angular distribution is desired. In order to do so, what is important is to reduce the luminous flux diameters of converged lights formed by the respective oval reflectors (in other words, the sizes of the light source images) as much as possible, and to arrange the respective light source images at a position as close to an apex of the reflection prism as possible. However, the more decreased the luminous flux diameters of the converged lights, the larger the light energies concentrated locally on the reflecting surfaces of the reflection prism becomes. Consequently, there arise problems such that reflecting films formed on the reflecting surfaces are deteriorated by locally generated heat or heat strain and the reflectance ratio is lowered, and that the reflecting surfaces by themselves are easily damaged and hence a high light output cannot be obtained stably as the illumination apparatus over a long period.

In order to avoid these problems, measures such as (1) arranging the reflecting surfaces at positions apart from a position where the luminous flux diameter of the converged light becomes minimum in the direction of the optical axis and preventing local concentration of the light energy, (2) limiting the intensity of the lights incident on the reflecting surfaces from the light source lamps, and (3) cooling the reflecting surfaces strongly, are contemplated. However, in the measure described in (1), since the converged light is positioned at a position apart from the apex of the reflection prism, the luminous flux diameter of the combined light reflected from the reflection prism and emitted in substantially one direction is increased and hence the angular distribution is widened, whereby the illuminating efficiency is lowered. In the measure in (2), since the quantity of the emitted light of the illumination apparatus is lowered, increase in luminance of the projected image as an original object is impaired. In the measure (3), a cooling device is upsized and tends to generate a large noise correspondingly, so that usability is lowered. In this manner, any of these measures cannot solve the problems fundamentally.

SUMMARY

An advantage of some aspects of the invention is to provide an illumination apparatus which is capable of providing a combined light having a small luminous flux diameter and a narrow divergence of the angular distribution and being emitted substantially in one direction efficiently using emitted lights from a plurality of light source units, has a high durability as an optical system, and is capable of providing a high light output stably over a long period.

According to a first aspect of the invention, there is provided an illumination apparatus including: a first light source unit and a second light source unit; and an optical axis converting element having a first reflecting surface configured to reflect a luminous flux emitted from the first light source unit and a second reflecting surface configured to reflect a luminous flux emitted from the second light source unit and being configured to reflect respective luminous fluxes emitted from the respective light source units in substantially one direction, in which the luminous fluxes entering the optical axis converting element each have different dimensions in two directions orthogonal to each other in a plane orthogonal to an emission axis of the each light source unit, and the optical axis converting element is arranged in such a manner that a cross-sectional shape of the respective luminous fluxes entering the optical axis converting element taken along the reflecting surface has a short side direction in the same direction as the direction of arrangement of the first reflecting surface and the second reflecting surface. The term "luminous fluxes incident on" means luminous fluxes incident on the optical axis converting element, and the term "emission axes of the light source units" means center axes of the luminous fluxes emitted from the light source units.

According to the configuration in the aspect, the luminous fluxes emitted from the respective light source units are condensed and, when being made incident on the optical axis converting element, each has cross-sectional dimensions different in the two directions orthogonal to each other in planes orthogonal to the emission axes of the respective light source units. Therefore, the luminous fluxes are less condensed in the direction orthogonal to the short side direction than in the short side direction, and hence concentration of light energy is restrained in comparison with a case where the luminous fluxes are condensed isotropically in the planes orthogonal to the emission axes of the respective light source units, so that the reflecting surfaces can hardly be overheated. Therefore, deterioration of the optical axis converting element is prevented, and the durability of optical systems is improved.

At this time, the respective luminous fluxes incident on the optical axis converting element each have the short side direction in the same direction as the direction of arrangement of the two reflecting surfaces. Therefore, by making the each luminous flux to incident on the each reflecting surface so as to be closer to the adjacent reflecting surface, the luminous fluxes incident on the optical axis converting element are brought close to each other, and then are emitted in one direction, so that a luminous flux formed by combining the luminous fluxes from the respective light source units, so called a combined luminous flux is obtained. Therefore, a luminous flux diameter of the combined luminous flux and a divergence of the angular distribution may be reduced. Accordingly, the illumination apparatus which is capable of obtaining a combined light having a small luminous flux diameter and a narrow divergence of the angular distribution and being emitted substantially in one direction efficiently, has a high durability as the optical system, and is capable of providing a high light output stably over a long period is provided.

Preferably, the reflecting surface is arranged at a position where the dimension of the short side direction of the cross-sectional shape of the luminous flux incident on the corresponding optical axis converting element is substantially minimized.

In this configuration, since the reflecting surfaces are positioned at positions where the cross-sectional dimensions of the luminous fluxes emitted from the respective light source units along the reflecting surfaces in the same direction as the direction of arrangement of the first and second reflecting surfaces (in other words, the direction in which the lights are combined) are substantially minimized, the luminous flux diameter and the divergence of the angular distribution of the luminous flux formed by combining the luminous fluxes from the respective light source units, that is, so called the combined luminous flux can be reduced.

Two features of the luminous flux incident on the optical axis converting element are contemplated. Preferably, the luminous flux incident on the optical axis converting element has a condensing angle in the direction orthogonal to an in-plane direction including the emission axis before and after being reflected from the reflecting surface larger than a condensing angle in the in-plane direction.

In this configuration, an optical path of the optical systems when combining the luminous fluxes from the plurality of light source units is relatively shortened, so that downsizing of the optical system is achieved.

Preferably, the luminous flux incident on the optical axis converting element has a condensing angle in the direction orthogonal to an in-plane direction including the emission axis before and after being reflected from the reflecting surface smaller than a condensing angle in the in-plane direction.

In this configuration, the divergence of the angular distribution of the combined luminous flux formed when the luminous fluxes from the plurality of light source units are combined is easily restrained, so that the parallelism of the combined luminous flux is enhanced.

Preferably, condensing angle changing elements are provided between the respective light source units and the optical axis converting element. The condensing angle changing elements each condense the luminous flux emitted from a light-emitting member of the each light source unit so as to have different condensing angles in two directions orthogonal to each other in a plane orthogonal to the emission axis of the each light source unit.

In this configuration, the condensing angles in the two directions orthogonal to each other in the planes orthogonal to the emission axes of the respective light source units may be set as required according to the design of the condensing angle changing element. In this case, since the light source unit itself having the same condensing angle in the two directions may be used, the light source unit generally used may be employed.

Preferably, the condensing angle changing element is a condensing element having a toric surface.

In this configuration, the condensing angles of the luminous fluxes incident on the optical axis converting element may be controlled in the two directions independently, whereby the converged diameter may be minimized at a desired position.

Preferably, the condensing angle changing element is a condensing element having a cylindrical surface.

In this configuration, the condensing angles of the luminous fluxes incident on the optical axis converting element may be controlled in one of the two directions independently, whereby the converged diameter may be minimized at a desired position.

Two types of such the condensing angle changing element are contemplated as described below.

Preferably, the condensing angle changing element is a lens member.

When the condensing angle changing element is made up of the lens member, the illumination apparatus is easily downsized.

Preferably, the condensing angle changing element is a reflection mirror.

In this configuration, the chromatic aberration does not occur in contrast to the lens member, and hence the luminous flux diameter can be made smaller than the case in which the lens member is used.

Preferably, the each light source unit includes a light-emitting member and an oval surface reflector configured to reflect the luminous flux emitted from the light-emitting member, and the light-emitting member is positioned at a focal position of the oval surface reflector.

When the oval reflector and a paraboloid reflector are compared, if the aperture of the reflector in the direction orthogonal to the emission axis is the same, the larger quantity of light from the light source unit can be obtained with the oval reflector, so that the efficiency of light utilization is higher with the oval reflector. Therefore, the light source unit suitable for the illumination apparatus intended to provide a high light output is obtained.

Preferably, the each light source unit includes a light-emitting member and a reflector for condensing the luminous flux emitted from the light-emitting member so as to have different condensing angles in two directions orthogonal to each other in a plane orthogonal to the emission axis of the each light source unit.

In this configuration, the condensing angle changing element is not needed and hence the reduction of the number of components of the illumination apparatus is achieved.

Preferably, a diverging angle changing element configured to cause the luminous flux emitted from the optical axis converting element to be emitted in such a manner that diverging angles in two directions orthogonal to each other in a plane orthogonal to an emission axis of the optical axis converting element are substantially matched is provided.

In this configuration, the luminous flux having different condensing angles in the two directions is changed into the luminous flux having the substantially same diverging angles in the two directions by the diverging angle changing element before being emitted therefrom. Therefore, when the optical system having an incident angle dependency as an optical characteristic is used in the downstream, the efficiency of light utilization in the optical system is enhanced.

Preferably, a parallelizing lens configured to convert the luminous flux incident on the optical axis converting element into a parallel light, and emits the same to the optical axis converting element, and a diverging light conversion element configured to convert the parallel light emitted from the optical axis converting element into the diverging light are provided.

In this configuration, since the arrangement flexibility of the optical axis converting element is enhanced, the illumination apparatus having a high design flexibility is achieved.

Preferably, the first reflecting surface and the second reflecting surface are provided so as to intersect in an X-shape when viewed in the direction of arrangement of the two reflecting surfaces.

In this configuration, a precise machining to avoid the reflecting surfaces from being discontinuous is not necessary at a point of contact between the reflecting surfaces, and hence formation of the optical axis converting element is simplified.

According to a second aspect of the invention, there is provided an illumination apparatus including: a plurality of light source units having a light-emitting member; and an optical axis converting element configured to reflect respective luminous fluxes emitted from the plurality of light source units from different reflecting surfaces in substantially one direction and emit the reflected luminous fluxes in substantially one direction as a combined luminous flux, wherein each of the respective luminous fluxes emitted from the plurality of light source units is a converged luminous flux having condensing angles different in two directions orthogonal to each other in a plane orthogonal to an emission axis of the each light source unit, and the optical axis converting element is arranged in such a manner that the reflecting surfaces are positioned so that dimensions of cross sections of the luminous fluxes emitted from the respective light source units taken along the corresponding reflecting surfaces in an in-plane direction including emission axes of the plurality of light source units and optical axes of the luminous fluxes reflected from the reflecting surfaces are smaller than dimensions of the cross sections thereof in a direction orthogonal to the in-plane direction.

In this configuration, since the luminous fluxes emitted from the respective light source units have condensing angles different in the two directions orthogonal to each other in planes orthogonal to the emission axes of the respective light source units, the cross-sectional dimensions of the luminous fluxes emitted from the respective light source units are different in the two directions orthogonal to each other in the planes orthogonal to the emission axes of the respective light source units. At this time, the reflecting surfaces of the optical axis converting element are positioned at positions where the cross-sectional dimensions of the luminous fluxes emitted from the respective light source units taken along the reflecting surfaces thereof in the in-plane directions (in other words, the direction in which the lights are combined) including the emission axes of the plurality of light source units are smaller than the cross-sectional dimensions in the direction orthogonal to the in-plane direction. Therefore by bringing the luminous fluxes from the light source units close to each other in the direction of the small cross-sectional dimension in the respective reflecting surfaces, the luminous flux diameter and the divergence of the angular distribution of the luminous flux formed by combining the luminous fluxes from the respective light source units, that is, so-called a combined luminous flux may be reduced.

Preferably, the reflecting surfaces are arranged at positions where the dimensions in the in-plane direction are substantially minimized.

In this configuration, since the reflecting surfaces are positioned at positions where the cross-sectional dimensions of the luminous fluxes emitted from the respective light source units along the reflecting surfaces in the in-plane direction including the emission axes of the plurality of light source units (in other words, the direction in which the lights are combined) are substantially minimized, the luminous flux diameter and the divergence of the angular distribution of the luminous flux formed by combining the luminous fluxes from the respective light source units, that is, so called the combined luminous flux can be reduced.

According to a third aspect of the invention, there is provided a projector including an illumination apparatus according to the aspect of the invention, an image forming element configured to form an image by a light emitted from the illumination apparatus, and a projection optical system configured to project the light emitted from the image forming element.

In this configuration, the projector providing projected images at a high display quality and having a superior durability is realized.

Preferably, a color separating optical system configured to separate the light emitted from the illumination apparatus into a plurality of colored lights; a plurality of the image forming elements corresponding respectively to the plurality of colored lights; and a color combining optical system configured to combine the plurality of colored lights emitted via the plurality of image forming elements are provided, and the color separating optical system includes a wavelength separation film having a dielectric multilayer film, and emission axes of two light source units of the illumination apparatus are arranged in a direction orthogonal to an in-plane direction including the emission axes before and after going through the wavelength separation films.

In this configuration, color nonuniformity can hardly occur when separating the wavelength by the wavelength separation film, so that the projector which is capable of displaying high-quality images is achieved.

BRIEF DESCRIPTION OF THE DRAWINGS

The invention will be described with reference to the accompanying drawings, where like numbers reference like elements.

FIG. 15A is a schematic configuration drawing of a projector according to a seventh embodiment of the invention, FIG. 15B is a perspective view of a reflector used in the apparatus, and FIG. 15C is a drawing schematically showing a cross-sectional shape of the reflector.

DESCRIPTION OF EXEMPLARY EMBODIMENTS

First Embodiment

Referring now to FIGS. 1 to 3F, a first embodiment of the invention will be described.

In the first embodiment, an example of a projector having an illumination apparatus configured to emit luminous fluxes from two light source units as a combined luminous flux will be described.

Figure 1:
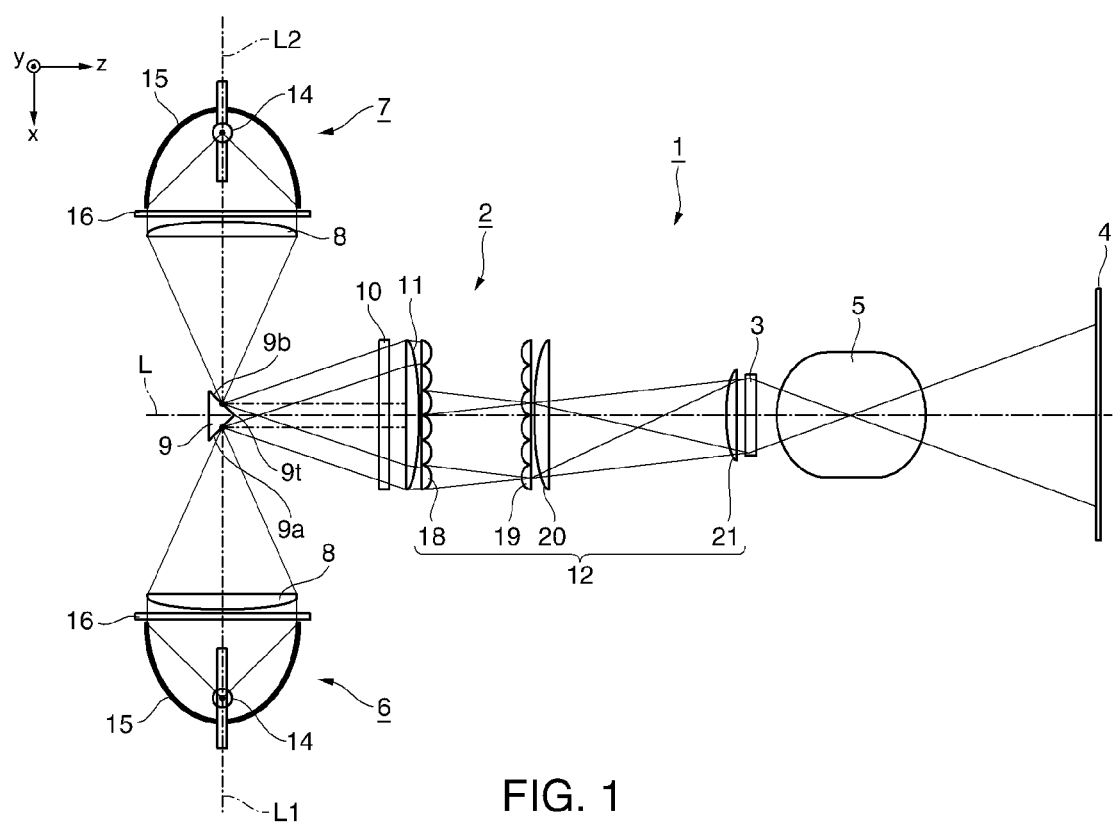
FIG. 1 is a schematic configuration drawing of a projector according to a first embodiment of the invention.
Figure 2:
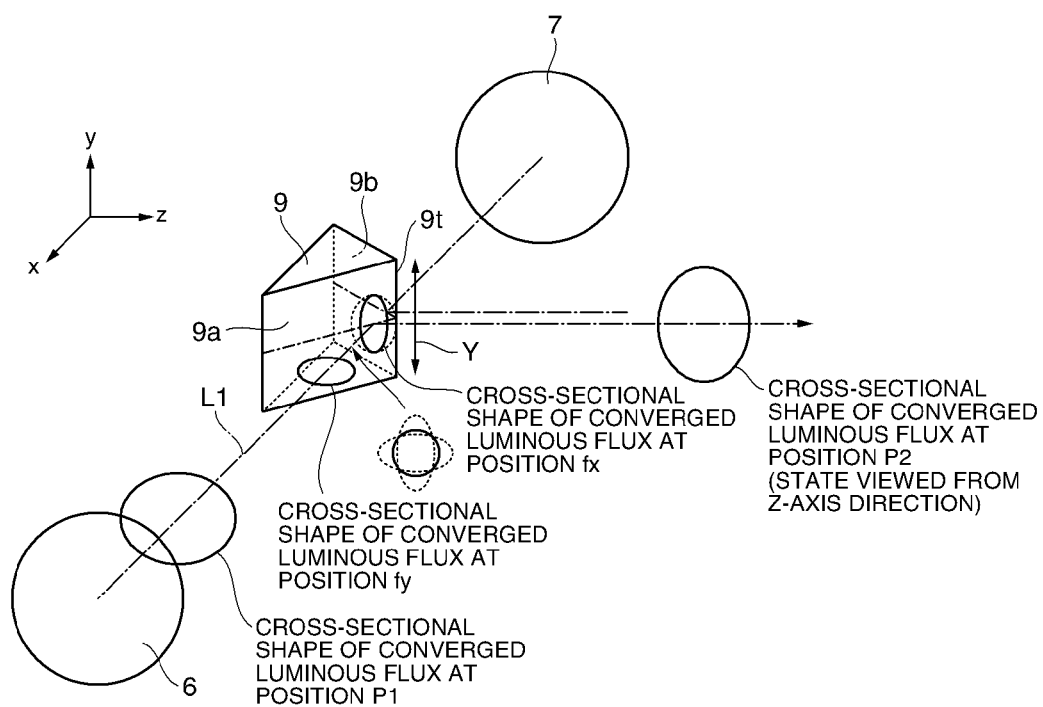
FIG. 2 is a perspective view showing a mode of change in cross-sectional shape of a luminous flux from a light source lamp in the projector according to the first embodiment of the invention.

FIG. 1 is a schematic configuration drawing of the projector according to the first embodiment. FIG. 2 is a perspective view diagrammatically showing a mode of change in cross-sectional shape of the luminous flux from the light source units. FIGS. 3A to 3F are explanatory drawings showing actions of a condensing angle changing lens and a diverging angle changing lens used in the projector.

In the respective following drawings, the dimensional scales may be differentiated depending on components for easy visual understanding of the respective components.

A projector 1 in the first embodiment includes an illumination apparatus 2, a light-modulating element 3 (image forming element) configured to generate a projecting light including image data modulated from an illuminating light, and a projection optical system 5 configured to project the projecting light emitted from the light-modulating element 3 on a projected surface such as a screen 4 as shown in FIG. 1.

In the following description, a substantial center axis of the illuminating light emitted from the illumination apparatus 2 is referred to as "illumination optical axis L", and optical axes of respective reflectors of a first light source unit 6 and a second light source unit 7 are referred to as "lamp optical axis L1" and "lamp optical axis L2", respectively. The "lamp optical axis" corresponds to "emission axis" in the claims.

The illumination apparatus 2 in the first embodiment mainly includes two light source units 6 and 7, condensing angle changing lenses 8 (condensing angle changing elements), a reflection prism 9 (optical axis converting element), two diverging angle changing lenses 10 and 11 (diverging angle changing elements), and an integrator unit 12. The condensing angle changing lenses 8 are configured to control condensing angles of luminous fluxes emitted from the respective light source units 6 and 7. The reflection prism 9 is a triangular prism having two reflecting surfaces 9a and 9b and is configured to reflect the respective luminous fluxes emitted from the two light source units 6 and 7 from the different reflecting surfaces 9a and 9b in substantially one direction, and causes the reflected luminous fluxes to emit in substantially one direction as a combined luminous flux. The two diverging angle changing lenses 10 and 11 are configured to control the diverging angle of a diverging luminous flux from the reflection prism 9. Hereinafter, respective ones of the two light source units 6 and 7 are referred to as a first light source unit and a second light source unit. In this example, the light source unit positioned in the +x direction with respect to the reflection prism 9 in FIG. 1 is referred to as the first light source unit 6, and the light source unit positioned in the −x direction is referred to as the second light source unit 7. The respective ones of the two diverging angle changing lenses 10 and 11 are referred to as a first diverging angle changing lens and a second diverging angle changing lens from the side closer to the reflection prism.

Luminous fluxes emitted from the respective light source units 6 and 7 along the lamp optical axes L1 and L2 are converted into converged luminous fluxes having a desired condensing angle by the condensing angle changing lenses 8 and are made incident on the reflection prism 9. Then, the converged luminous fluxes incident on the reflection prism 9 are changed in the direction of travel by the reflecting surfaces 9a and 9b thereof by substantially 90°. and are converted into diverging luminous fluxes, and enter the first diverging angle changing lens 10 and the second diverging angle changing lens 11 arranged along the illumination optical axis L in sequence. The diverging luminous fluxes entering from the respective light source units 6 and 7 to the two diverging angle changing lenses 10 and 11 are reduced in diverging property, and enter the integrator unit 12 in the form of a combined luminous flux substantially parallel to the illumination optical axis L. In the integrator unit 12, the illumination distribution in the illumination target is converted into a substantially uniform illumination luminous flux, and illuminates the light-modulating element 3, which is the illumination target. A liquid crystal display elements having a pixel structure and a micro mirror array element having a plurality of movable mirrors in an array pattern are used as the light-modulating element 3. The illumination luminous flux entering the light-modulating element 3 is modulated according to data from the outside, and is emitted in the form of a projection luminous flux including the image data. The emitted projection luminous flux is guided onto a projected surface such as the screen 4 by the projection optical system 5 such as a projection lens, and then the image data is displayed.

The two light source units 6 and 7 both have the same configuration and each includes a light-emitting lamp 14 (light-emitting member), a reflector 15, and an UV and IR cut filter 16. As the light-emitting lamp 14, a high-pressure mercury lamp, a metal halide lamp, a xenon lamp, a light emitting diode (LED) or the like may be employed. As the reflector 15, a paraboloid reflector which has a paraboloid reflecting surface and emits substantially parallel luminous fluxes is preferably used. The light-emitting lamps 14 are arranged so that light-emitting points thereof are positioned substantially at focal points of the reflectors 15. Lights radiated from the light-emitting lamps 14 are reflected from the reflectors 15, and are emitted as luminous fluxes in substantially parallel with the lamp optical axes L1 and L2, and unnecessary UV light and infrared light are removed by the UV and IR cut filters 16. The substantially parallel luminous fluxes passing through the UV and IR cut filters 16 enter the condensing angle changing lenses 8 having a toric surface, and are converted into converged luminous fluxes having different condensing angles in the direction orthogonal to the lamp optical axes L1 and L2.

As shown in FIG. 2, the luminous flux emitted from the first light source unit 6 is made incident on the reflection prism 9 while being condensed in the z direction (in the x direction after having reflected from the reflection prism 9) orthogonal to each other to the lamp optical axis L1 and the y direction with a different condensing angle by the condensing angle changing lens 8 (not shown) and, after having reflected from the reflection prism 9, proceeds toward the diverging angle changing lens 10 (not shown) in the form of a diverging luminous flux. Here, the reflection prism 9 is arranged at a position where the luminous flux diameter of the converged luminous flux is minimized in the z direction. Accordingly, the luminous flux diameter of the converged luminous flux in the z direction is minimized in the extreme vicinity of the reflecting surface 9a of the reflection prism 9. The reflecting surface 9a (or a normal line of the reflecting surface 9a) is arranged so as to be inclined by substantially 45° with respect to the lamp optical axis L1, and hence the luminous flux diameter on the reflecting surface 9a is extended in the direction of inclination as a projected image shown by a broken line in FIG. 2. Therefore, the reflection prism 9 is arranged so that the projected image is formed with little lacking while the projected image being in contact with an apex 9t (ridge line being in contact with the two reflecting surfaces 9a and 9b) of the reflection prism 9. In contrast, the luminous flux diameter of the converged luminous flux in the y direction is minimized in a stage before (the side of the first light source unit 6) the reflection prism 9, and is made incident on the reflecting surface 9a in a state of being larger than the minimum diameter.

The relationship between such the mode of the change of the luminous flux diameter and the actions of the condensing angle changing lens 8 and the diverging angle changing lenses 10 and 11 will be described with reference to FIGS. 3A to 3F.

Figure 3A:
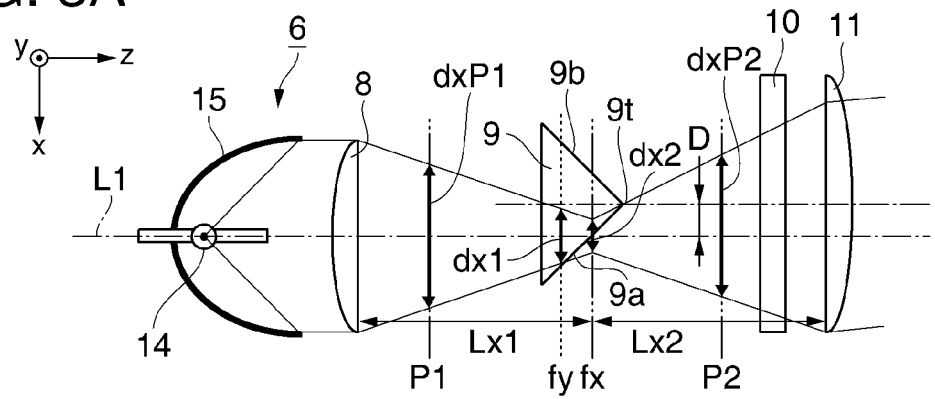
FIGS. 3A to 3F are explanatory drawings showing actions of a condensing angle changing lens and a diverging angle changing lens used in the projector according to the first embodiment of the invention.
Figure 3B:
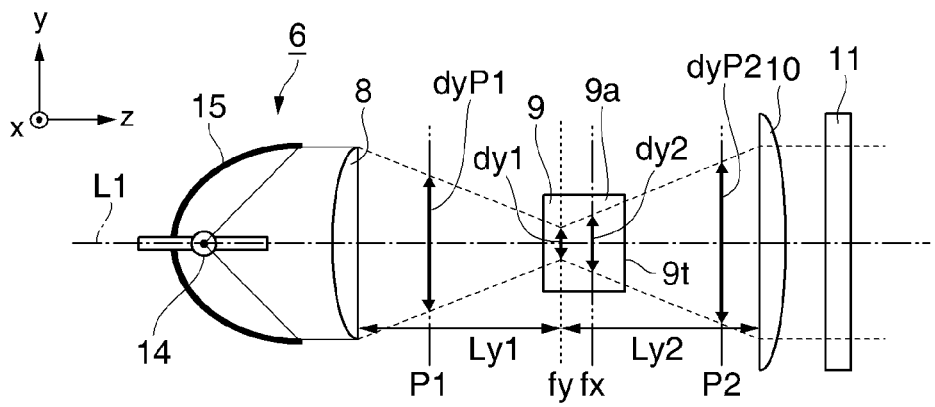

FIGS. 3A to 3F are drawings showing an optical path from the first light source unit 6 to the second diverging angle changing lens 11 which is bent actually by substantially 90° at the reflecting surface 9a of the reflection prism 9 as shown in FIG. 2 linearly so that the lamp optical axis L1 is directed in the z axis for easy understanding of the description. FIG. 3A is a drawing showing a mode of the change of the luminous flux diameter on a plane (xz plane) including the two lamp optical axes L1 and L2, and FIG. 3B is a drawing showing a mode of the change of the luminous flux diameter on a plane (yz plane) orthogonal to the plane (xz plane) including the two lamp optical axes L1 and L2. FIGS. 3C, 3D, 3E, and 3F are drawings diagrammatically showing respectively the cross-sectional shapes of a converged light taken along xy planes at respective positions P1, fy, fx, and P2 in FIGS. 3A and 3B. In FIGS. 3A to 3F, since the lamp optical axis from the first light source unit to the reflecting surface of the reflection prism is shown so as to match the z axis, the cross-sectional shapes shown in FIGS. 3C and 3D correspond to cross-sectional shapes on a yz plane in the actual apparatus shown in FIG. 1.

A light emitting unit of the light-emitting lamp 14 is not a point, but is the light-emitting member having a limited size. Therefore, when the light from the light-emitting lamp 14 is converged, it is not converged into a point, but into a converged light having a limited luminous flux diameter. Therefore, the position fy indicates a position where the cross-sectional dimension in the y direction is minimized, the position fx indicates a position where the cross-sectional dimension in the x direction is minimized, the position P1 indicates a given position in the vicinity of the condensing angle changing lens 8 on the light-going side, and the position P2 indicates a given position in the vicinity of the first diverging angle changing lens 10 on the light-incident side. In the following description, a light proceeding from the first light source unit 6 to the second diverging angle changing lens 11 is exemplified. However, a state of change of the luminous flux diameter and the converged angle of a light exceeding from the second light source unit 7 to the second diverging angle changing lens 11 are the same as those of the light proceeding from the first light source unit except in that the direction of travel of the light from the second light source unit 7 to the reflection prism 9 is opposite.

Figure 3C:
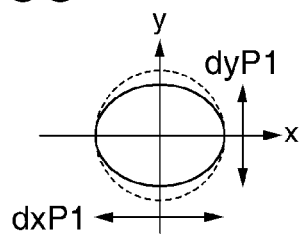
Figure 3D:
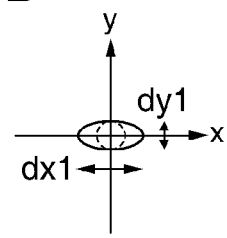
Figure 3E:
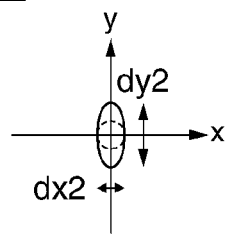
Figure 3F:
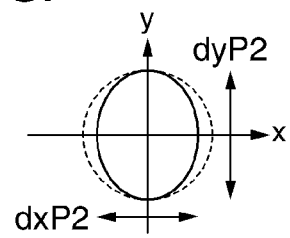
Figure 4:
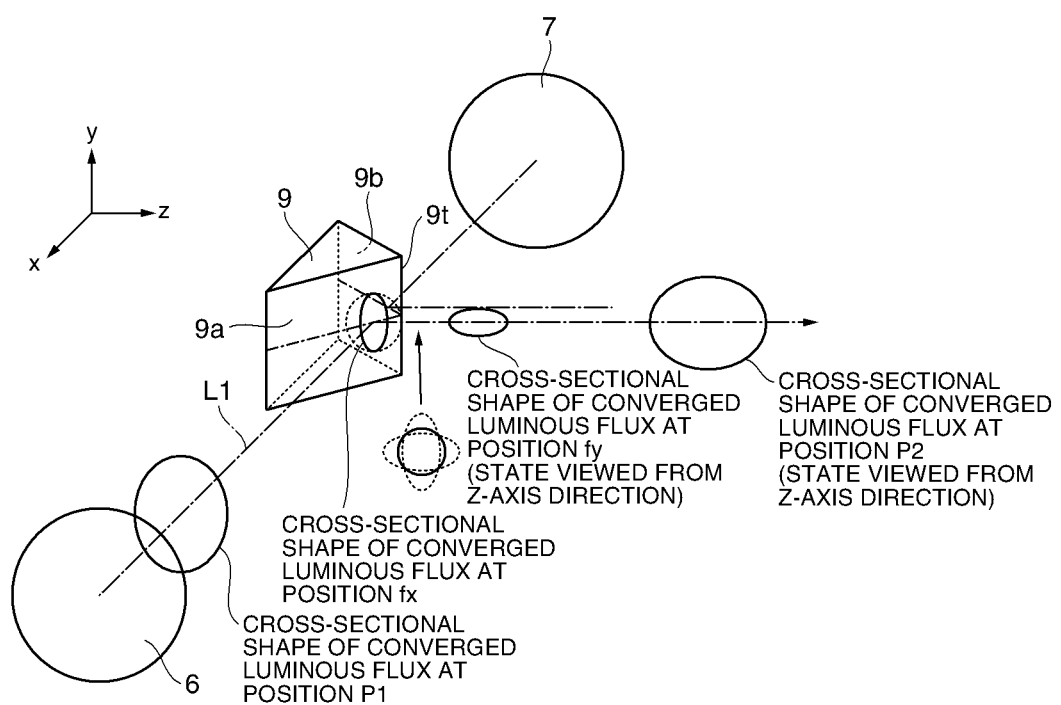
FIG. 4 is a perspective view showing a mode of change in cross-sectional shape of the luminous flux from the light source lamp in the projector according to a second embodiment of the invention.
Figure 5A:
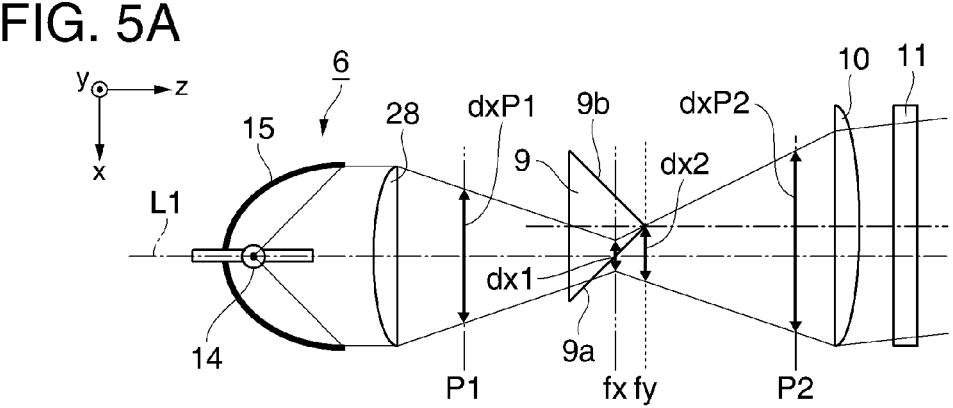
FIGS. 5A to 5F are explanatory drawings showing actions of the condensing angle changing lens and the diverging angle changing lens used in the projector according to the second embodiment of the invention.
Figure 5B:
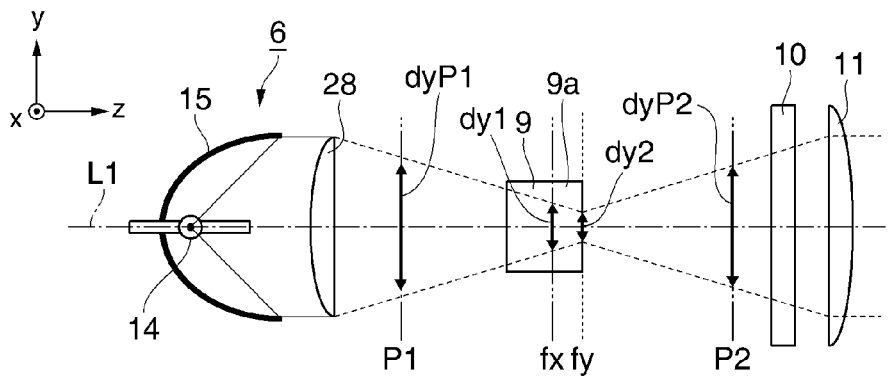
Figure 5C:
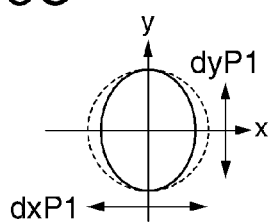
Figure 5D:
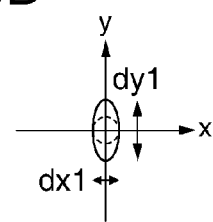
Figure 5E:
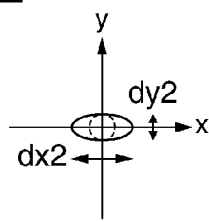
Figure 5F:
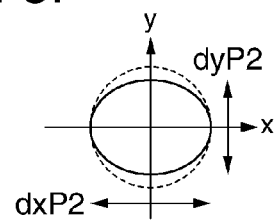

The condensing angle changing lens 8 in the first embodiment has a toric surface being small in radius of curvature in the y direction in comparison with the x direction. In other words, when the focal length of the condensing angle changing lens 8 in the x direction is designated as Lx1 and the focal length thereof in the y direction is designated as Ly1, the relationship in length therebetween is Lx1>Ly1. Accordingly, the substantially parallel luminous flux entering the condensing angle changing lens 8 is converted into a converged luminous flux having a condensing angle larger in the y direction than the x direction and emitted therefrom. Therefore, when focusing an attention on the cross-sectional dimensions in the xy plane (actually the yz plane at the positions P1 and fy) of the converged luminous flux, as shown in FIGS. 3C and 3D, the luminous flux diameter at the position fy is a minimum diameter dy1 in the y direction, but is a luminous flux diameter dx1, which does not reach the minimum diameter yet, even though it is smaller in the x direction than that at the position P1. In contrast, as shown in FIG. 3E, the luminous flux diameter at the position fx is a minimum diameter dx2 in the x direction, but is a luminous flux diameter dy2 which is larger than the minimum diameter in the y direction. In other words, the relation is dx1>dx2 in the x direction, and dy1<dy2 in the y direction.

As shown in FIG. 1, the reflection prism 9 is arranged in such a manner that normal lines to the two reflecting surfaces 9a and 9b are positioned on an xz plane and the two reflecting surfaces 9a and 9b are each arranged so as to form an angle of substantially 45° with respect to the lamp optical axes L1 and L2 and the illumination optical axis L in order to cause the lights emitted from the two light source units 6 and 7 and proceed in the −x direction or the x direction to be reflected in the z direction. In order to combine the luminous fluxes from the two light source units 6 and 7 efficiently and enhance the efficiency of light utilization in the optical element or the like in the downstream here, it is important to reduce the luminous flux diameter and a divergence of the angular distribution of the combined luminous flux including the two diverging luminous fluxes. Therefore, it is important to reduce the diameters of the luminous fluxes incident on the two reflecting surfaces 9a and 9b in the direction in which the luminous fluxes from the two light source units 6 and 7 are combined (the direction of arrangement of the lamp optical axes L1 and L2) and cause the luminous flux to reflect at positions close to the apex 9t (the ridge line being in contact with the two reflecting surfaces) of the reflection prism 9 so that the illumination optical axis L and the lamp optical axes L1 and L2 are positioned in proximity. However, it is desirable to cause the luminous fluxes to reflect at positions so that the projected images of the luminous fluxes from the two light source units 6 and 7 are substantially formed on the reflecting surfaces 9a and 9b without lacking. In the following description, the efficiency in the case of combining the luminous fluxes from the two light source units 6 and 7 is referred to as "combining efficiency".

In order to do so, as shown in FIG. 3A, the reflecting surface 9a (and the lamp optical axis L1) is arranged so that the apex 9t of the reflection prism 9 is apart from the lamp optical axis L1 by a distance D which is half the luminous flux diameter dx2 at the position fx on the xz plane where the luminous flux diameter is minimized. With this relationship in arrangement, the projected image of the luminous flux incident on the reflecting surface 9a is formed so as to come into contact with the apex 9t. Accordingly, almost all of the luminous fluxes incident on the reflection prism 9 is reflected from the reflecting surface 9a, and after having reflected, passes through a position extremely close to the illumination optical axis L and enters the first diverging angle changing lens 10. In contrast, since the extent (large or small) of the luminous flux diameter of the luminous flux incident on the reflecting surface 9a in the y direction does not affect on the positional relationship between the illumination optical axis L and the reflecting surface 9a (and the lamp optical axis L1), that is, on the combining efficiency described above, it is not necessary to minimize the luminous flux diameter in the y direction. Therefore, although the cross-section of the luminous flux when being made incident on the reflecting surface 9a has a minimum diameter in the xz plane, it has a luminous flux diameter larger than the minimum diameter in the yx plane. At this time, when the cross-section extending along the reflecting surface 9a of the luminous flux incident on the reflecting surface 9a is considered, the cross-sectional dimensions on the xz plane is the smallest, and the cross-sectional dimensions in the direction of the y axis which extends orthogonally to the xz plane is larger than the minimum dimension.

The luminous flux reflected from the reflecting surface 9a enters the first diverging angle changing lens 10 and the second diverging angle changing lens 11 arranged in sequence along the illumination optical axis L in the form of the diverging luminous flux. The first diverging angle changing lens 10 here is a cylindrical lens having a curvature only in the y direction. In contrast, the second diverging angle changing lens 11 here is a cylindrical lens having a curvature only in the x direction. In other words, the first diverging angle changing lens 10 has a focal length of Ly2 in the y direction and an infinite radius of curvature in the x direction, and the second diverging angle changing lens 11 has a focal length of Lx2 in the x direction and an infinite radius of curvature in the y direction. The first diverging angle changing lens 10 is arranged at a position apart from the position fy where the luminous flux diameter in the y direction is minimized by a focal length Ly2 as shown in FIG. 3B, and the second diverging angle changing lens 11 is arranged at a position apart from the position fx where the luminous flux diameter in the x direction is minimized by a focal length Lx2 as shown in FIG. 3A.

Therefore, the diverging luminous flux entering the diverging angle changing lenses 10 and 11 is attenuated in diverging property in the y direction by the first diverging angle changing lens 10, and then is attenuated in diverging property in the x direction by the second diverging angle changing lens 11, and is emitted as a luminous flux in substantially parallel with the illumination optical axis L. More precisely, while the two diverging angle changing lenses 10 and 11 are arranged so that the illumination optical axis L passes through the centers thereof, the two lamp optical axes L1 and L2 are bent at the reflecting surfaces 9a and 9b, and then arranged in parallel at a slight distance D from the illumination optical axis L, so that the respective diverging luminous fluxes enter the two diverging angle changing lenses 10 and 11 along the corresponding lamp optical axes L1 and L2. Therefore, the combined luminous flux emitted from the second diverging angle changing lens 11 is a luminous flux having a divergence of the angular distribution caused by the distance D. However, the divergence of the angular distribution is small, and can be considered to be a substantially parallel luminous flux.

The luminous flux emitted from the second diverging angle changing lens 11 enters the integrator unit 12 including two lens arrays 18 and 19, a superimposed lens 20, and a parallelizing lens 21 or the like as shown in FIG. 1, thereby being converted into an illumination luminous flux providing a substantially uniform illumination distribution on the illumination target and illuminating the light-modulating element 3 as the illumination target.

According to the illumination apparatus 2 in the first embodiment, a combined luminous flux having a small luminous flux diameter and a narrow divergence of the angular distribution is obtained because the reflecting surfaces 9a and 9b of the reflection prism 9 are arranged so that the lamp optical axes L1 and L2 of the respective light source units 6 and 7 are positioned extremely close to the apex 9t of the reflection prism 9 at the position fx where the luminous flux diameter in the direction in which the luminous fluxes from the two light source units 6 and 7 are reflected to generate the combined luminous flux in the reflection prism 9 (the direction in which the two luminous fluxes are combined, the x direction or the z direction) is minimized. The luminous flux diameter does not have to be minimized in the direction orthogonal to the direction in which the two luminous fluxes are combined (the direction indicated by an arrow Y in FIG. 2), and there is only a little limitation in dimensions of the reflecting surfaces 9a and 9b, so that the luminous flux diverged in the y direction can be made incident thereto. In other words, in comparison with the case of the optical system in the related art in which the cross-sectional dimensions of the luminous fluxes incident on the reflecting surfaces 9a and 9b are substantially the same in the two directions orthogonal to the lamp optical axes L1 and L2 with respect to each other, the cross sectional areas of the luminous fluxes incident on the reflecting surfaces 9a and 9b can be increased without deteriorating the combining efficiency by making the cross-sectional dimensions of the luminous fluxes incident on the reflecting surfaces 9a and 9b to have different cross-sectional dimensions in the two directions orthogonal to the lamp optical axes L1 and L2 with respect to each other by using the condensing angle changing lens 8, whereby the intensity of the lights incident on the reflecting surfaces 9a and 9b per unit area can be reduced. Consequently, generation of local heat or heat strain is restrained, so that deterioration of the reflecting surfaces by the light or the heat is prevented.

The diverging luminous fluxes reflected from the reflecting surfaces 9a and 9b can be converted to luminous fluxes substantially parallel to the illumination optical axis L by the two diverging angle changing lenses 10 and 11. Therefore, in the course of changing the directions of travel of the luminous fluxes emitted from the two light source units 6 and 7 by the reflection prism 9 and generating a combined luminous flux from the two luminous fluxes, even when the process of differentiating the position where the luminous flux diameter is minimized in the two directions orthogonal to the illumination optical axis L with each other is employed, lowering of the illuminating efficiency (efficiency of light utilization) in the optical system from the diverging angle changing lenses 10 and 11 onward is little resulted. According to the manner described above, the illumination apparatus which provides a high light output stably over a long period is realized. In addition, with the provision of the illumination apparatus 2 as described above, the projector 1 providing projected images at a high display quality and having a superior durability is realized.

In addition to the configuration using the single lenses as described above as the condensing angle changing lens 8, the first diverging angle changing lens 10, and the second diverging angle changing lens 11, a composite lens system using a plurality of lenses, an aspherical lens whose curvature of the surface changes in an aspherical shape, a hybrid lens system formed with a diffraction grating on the lens surface, and an optical system using a diffraction element or a hologram element or the like are also applicable. When these configurations are employed, the luminous flux condensing property is further improved, so that the converged light having a smaller diameter is preferably generated.

The angles of installation of the two reflecting surfaces 9a and 9b with respect to the lamp optical axes L1 and L2 and the illumination optical axis L are not limited to those described in the first embodiment. In other words, an optical arrangement in which the reflecting angle at the reflecting surfaces 9a and 9b is set to an angle other than 45° is also applicable. The example of such configuration will be described in a fifth embodiment.

Second Embodiment

Referring now to FIGS. 4 and 5A to 5F, a second embodiment of the invention will be described.

The illumination apparatus in the second embodiment is the same as that in the first embodiment in the basic structure, and is different only in the condensing feature of the condensing angle changing lens.

FIGS. 4 and 5A to 5F correspond to FIGS. 2 and 3A to 3F used for describing the illumination apparatus in the first embodiment described above. In FIGS. 4 and 5A to 5F, common components as those in FIGS. 2 and 3A to 3F are designated by the same signs and detailed description will be omitted.

The illumination apparatus in the first embodiment described above shown in FIGS. 2 and 3A to 3F has the configuration in which the converging position fy of the luminous flux in the y direction is positioned at a position shifted to the side of the light source unit with respect to the converging position fx of the luminous flux in the x direction, that is, the condensing angle of the luminous flux is larger in the y direction than in the x direction in the x direction and in the y direction orthogonal to the lamp optical axis L1 with respect to each other. In contrast, as shown in FIGS. 4 and 5A to 5F, according to the illumination apparatus in the second embodiment, a configuration in which the converging position fy of the luminous flux in the y direction is positioned at a position shifted to the side of the illumination target with respect to the converging position fx of the luminous flux in the x direction by the condensing angle changing lens 28, that is, the condensing angle in the y direction is smaller than that in the x direction is employed.

According to the illumination apparatus in the second embodiment as well, the same effect as the illumination apparatus according to the first embodiment in which the combined luminous flux having a small luminous flux diameter and a narrow divergence of the angular distribution is efficiently obtained, and a high light output is provided stably over a long period with a high durability is achieved. In addition, according to the configuration in the second embodiment, although the distance from a condensing angle changing lens 28 to the second diverging angle changing lens 11 is longer than the case in the first embodiment, the condensing angle is relatively reduced, so that the parallelism of the luminous flux emitted from the two diverging angle changing lenses 10 and 11 is enhanced. Therefore, when the optical systems having the incident angle dependency such as the integrator, a polarization conversion optical system, a dichroic element, or a liquid crystal light valve are arranged in the downstream of the second diverging angle changing lens 11, an advantage such that the efficiency of light utilization in these optical systems are enhanced is achieved.

Third Embodiment

Referring now to FIGS. 6A to 8B, a third embodiment of the invention will be described.

The illumination apparatus in the third embodiment is the same as that in the first and second embodiments in the basic structure, and is different only in the condensing feature of the reflector.

FIGS. 6A to 8B correspond to FIGS. 3A to 3F used for describing the illumination apparatus in the first embodiment described above and FIGS. 5A to 5F used for describing the illumination apparatus in the second embodiment described above. In FIGS. 6A to 8B, common components as those in FIGS. 3A to 3F and 5A to 5F are designated by the same signs and detailed description will be omitted.

Figure 6A:
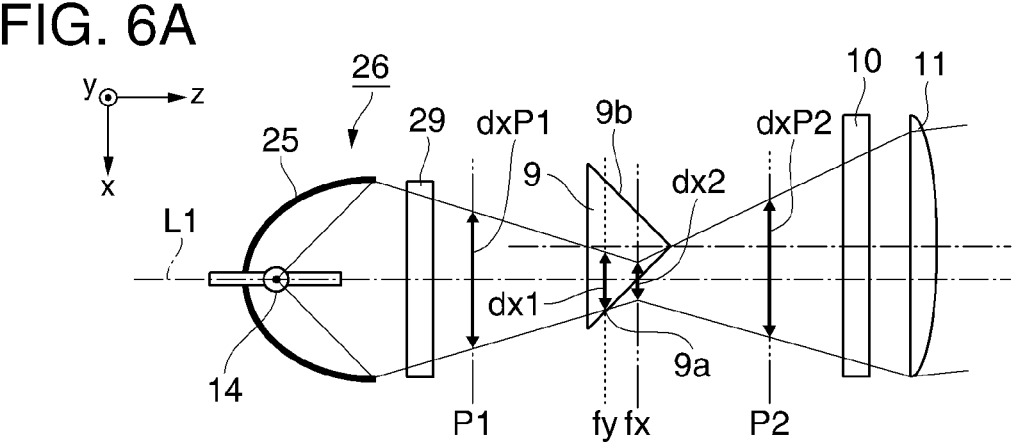
FIGS. 6A and 6B are explanatory drawings showing actions of the condensing angle changing lens and the diverging angle changing lens used in the projector according to a third embodiment of the invention.
Figure 6B:
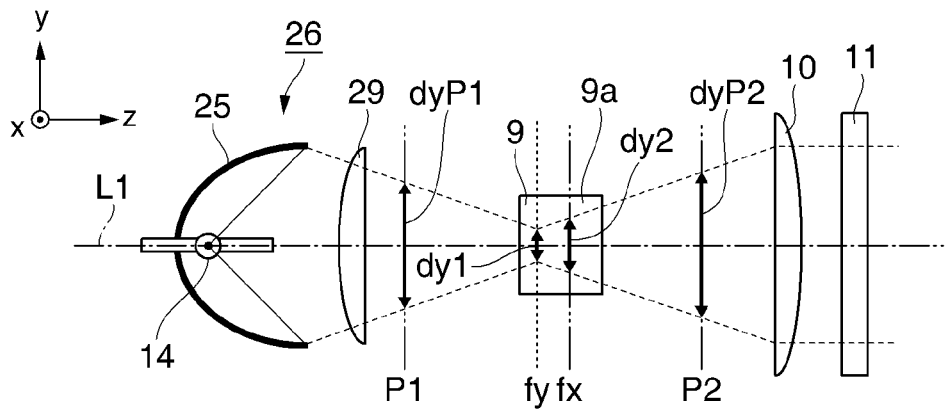
Figure 7A:
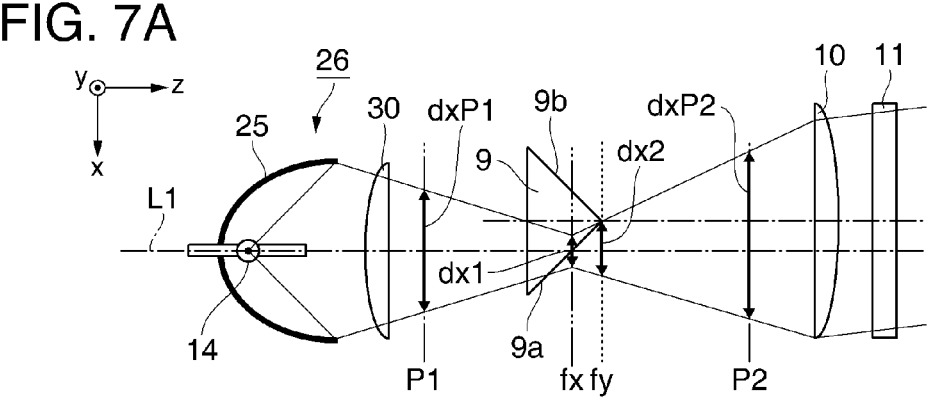
FIGS. 7A and 7B are explanatory drawings of a modification of the third embodiment of the invention.
Figure 7B:
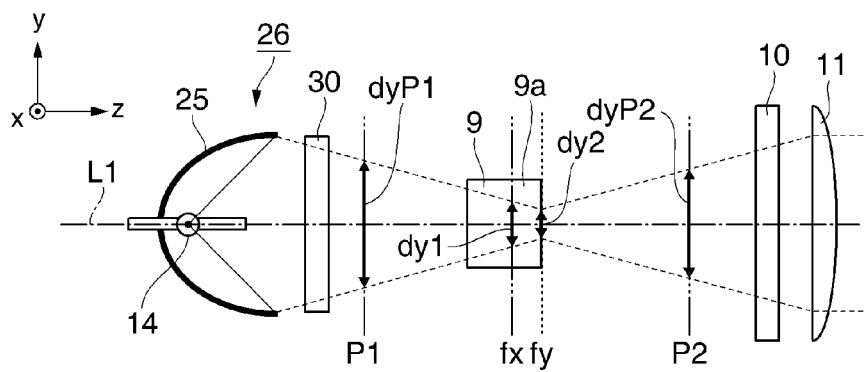

In the illumination apparatuses in the first and second embodiments, the paraboloid reflectors are provided in the light source units. In contrast, in the illumination apparatus according to the third embodiment, an oval reflector 25 is provided in a light source unit 26. The oval reflector 25 is arranged so that a light-emitting point of the light-emitting lamp 14 is positioned at a first focal point of the oval reflector 25, and a light radiated from the light-emitting point is reflected from the oval reflector 25 and is converged to a second focal point. FIGS. 6A and 6B show a configuration in which, in the x direction and in the y direction orthogonal to the lamp optical axis L1 with respect to each other, the condensing angle of the luminous flux is larger in the y direction than in the x direction, and FIGS. 7A and 7B show a configuration in which the condensing angle of the luminous flux is smaller in the y direction than in the x direction. As shown in these drawings, the luminous flux emitted from the oval reflector 25 is a converged luminous flux whose axis of symmetry is the lamp optical axis L1, and has the equal condensing angles in the two directions orthogonal to the lamp optical axis L1 with respect to each other. Therefore, what is essential to condensing angle changing lenses 29 and 30 in the third embodiment is only to have a function to change the condensing angle in one of the two directions, and the cylindrical lens having a convex surface or a concave surface may be employed.

With the cylindrical lens having the convex surface, the condensing angle of the luminous flux may be enlarged in the direction having the curvature (refracting power), while with the cylindrical lens having the concave surface, the condensing angle of the luminous flux may be reduced in the direction having the curvature (refracting power). As a matter of course, in addition to the configuration using the single lens as the cylindrical lens, a composite lens system using a plurality of lenses, an aspherical lens whose curvature of the surface changes in an aspherical shape, a hybrid lens system formed with a diffraction grating on the lens surface, and an optical system using a diffraction element or a hologram element or the like are also applicable. When these configurations are employed, the luminous flux condensing property is further improved, so that the converged light having a smaller diameter is preferably generated.

According to the illumination apparatus in the third embodiment as well, the same effect as the illumination apparatus according to the first embodiment in which the combined light flux having a small luminous flux diameter and a narrow divergence of the angular distribution is efficiently obtained, and a high light output is provided stably over a long period with a high durability is achieved. Further, according to the configuration in the third embodiment, the condensing angle changing lenses 29 and 30 having the cylindrical surfaces are easy to manufacture in comparison with the condensing angle changing lens having the toric surface, whereby cost reduction of the optical systems is easily achieved. Since the luminous flux is converted into the converged luminous flux already in the stage of being emitted from the oval reflector 25, the distance from the light source unit 6 to the converging positions fx and fy can be reduced, so that downsizing of the optical systems is achieved. In addition, when the oval reflector 25 and the paraboloid reflector are compared, it is known that if the aperture thereof in the direction orthogonal to the lamp optical axis L1 is the same, the larger quantity of light from the light-emitting lamp 14 can be obtained, so that the efficiency of light utilization is higher with the oval reflector. In the illumination apparatus in the third embodiment, since the light source unit 26 includes the oval reflector 25, a high light output is achieved.

In FIGS. 6A to 7B, the case where the cylindrical lenses having the convex surface are used as the condensing angle changing lenses 29, 30 have been described. However, what is essential is to have a function to change the condensing angle in one of the two directions. Therefore, a configuration in which the cylindrical lens having the concave surface is used is also applicable as described later.

Figure 8A:
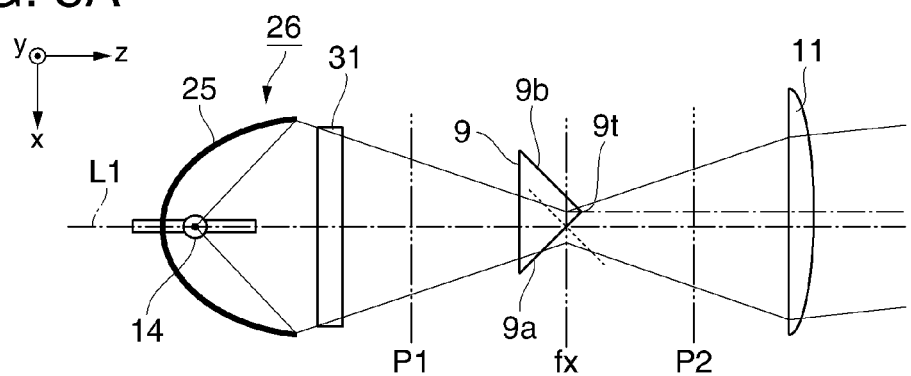
FIGS. 8A and 8B are explanatory drawings of another modification of the third embodiment of the invention.
Figure 8B:
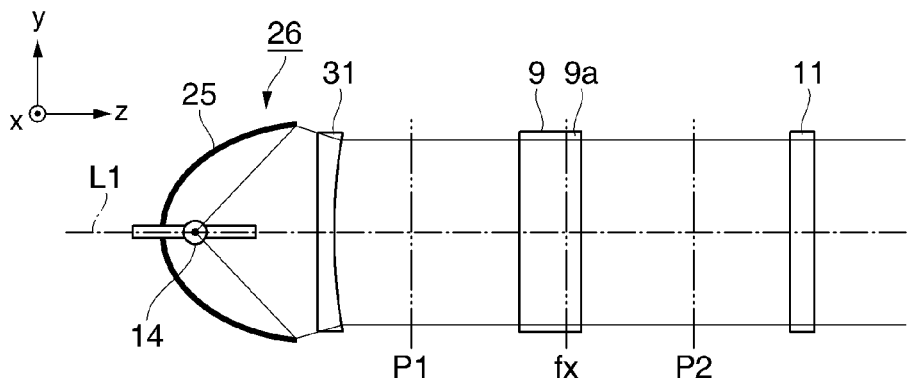

FIGS. 8A and 8B are explanatory drawings showing a modification of the third embodiment and correspond to FIGS. 6A and 6B. A condensing angle changing lens 31 shown in FIGS. 8A and 8B is a cylindrical lens having the concave surface, and has a curvature only in the y direction. The condensing angle changing lens 31 to be selected is the one having a curvature which is able to convert the converged luminous flux emitted from the light source unit 26 into a substantially parallel light in the y direction on the basis of the curvature of the oval reflector 25.

Therefore, as shown in FIG. 8A, the converged luminous flux emitted from the light source unit 26 passes through the condensing angle changing lens 31, and hence is made incident on the reflection prism 9 as the converted luminous flux without being changed in condensing angle in the x direction. In contrast, as shown in FIG. 8B, in the y direction, the converged luminous flux emitted from the light source unit 26 changes in condensing angle and is made incident on the reflection prism 9 as the substantially parallel light. The light reflected from the reflection prism 9 passes through the diverging angle changing lens 11 as the cylindrical lens having a curvature only in the x direction, thereby being converted into the substantially parallel light and emitted therefrom.

In this configuration, the same effect as the illumination apparatus according to the first embodiment in which the combined light having a small luminous flux diameter and a narrow divergence of the angular distribution is efficiently obtained, and a high light output is provided stably over a long period with a high durability is achieved in the same manner as the configuration in which the cylindrical lenses having a convex surface are provided as the condensing angle changing lenses 29 and 30 as described above.

Fourth Embodiment

Referring now to FIGS. 9A to 10B, a fourth embodiment of the invention will be described.

The illumination apparatus in the fourth embodiment is the same as that in the third embodiment in the basic structure and is different only in that the light emitted from the light source unit further passes a lens before entering the reflection prism 9 and after having gone out from the reflection prism 9 (after the reflection). FIGS. 9A to 10B are drawings corresponding to FIGS. 8A and 8B used in the description of the illumination apparatus in the third embodiment described above. In FIGS. 9A to 10B, the condensing feature of the reflector of the light source unit, and the configuration of the condensing angle changing lens to which the light emitted from the light source unit enters are different. In FIGS. 9A to 10B, common components as those in FIGS. 8A and 8B are designated by the same signs and detailed description will be omitted.

Figure 9A:
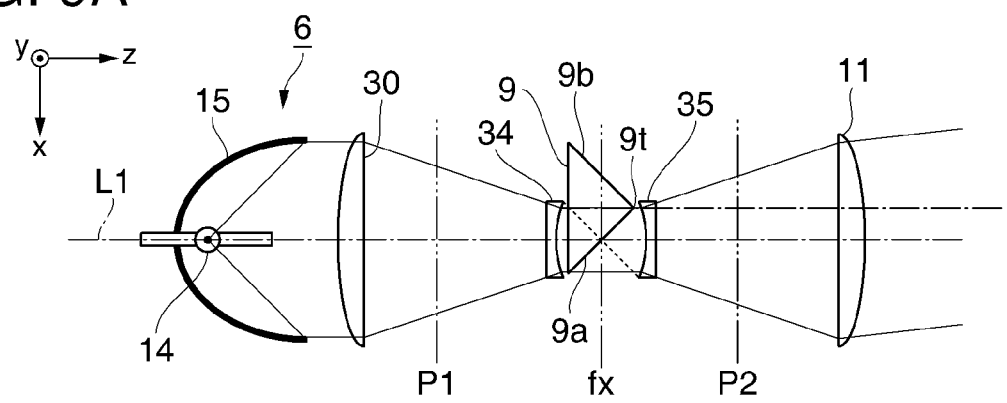
FIGS. 9A and 9B are schematic configuration drawings of a projector according to a fourth embodiment of the invention.
Figure 9B:
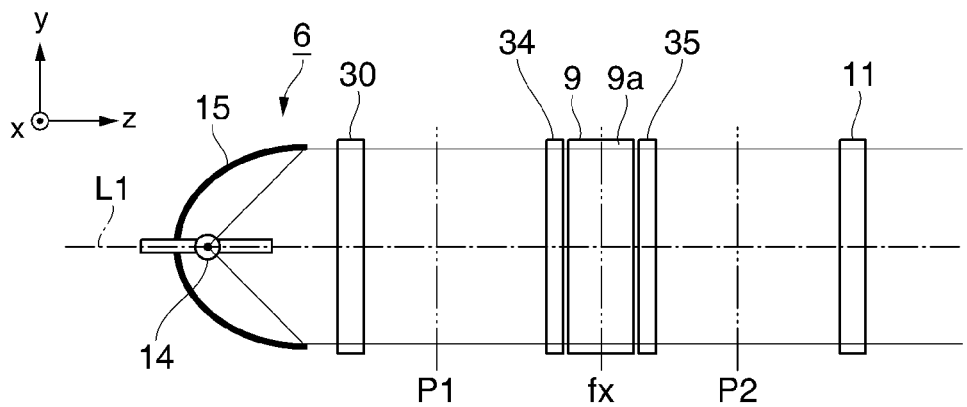

The illumination apparatus shown in FIGS. 9A and 9B in the fourth embodiment includes a parallelizing lens 34 on an optical path of the light source unit 6 having the paraboloid reflector 15 and the condensing angle changing lens 30 as the cylindrical lens having a curvature only in the x direction, and the reflection prism 9, and a diverging light conversion lens (diverging light conversion elements) 35 on an optical path between the reflection prism 9 and the diverging angle changing lens 11. The parallelizing lens 34 and the diverging light conversion lens 35 are both the cylindrical lenses having a concave surface, and has a curvature only in the same direction (x direction) as the diverging angle changing lens 11 provided in the downstream. The parallelizing lens 34 is arranged on the side of the light source unit 6 with respect to the focal position (converging position fx) of the condensing angle changing lens 30, and the diverging light conversion lens 35 is arranged on the opposite side (the side of the diverging angle changing lens 11) from the light source unit 6 with respect to the focal position (converging position fx) of the condensing angle changing lens 30.

In the illumination apparatus in the fourth embodiment, with the provision of the parallelizing lens 34 and the diverging light conversion lens 35 as described above, the substantially parallel light emitted from the light source unit 6 having the paraboloid reflector 15 is converted into the converged luminous flux condensed only in the x direction by the condensing angle changing lens 30 at first. The converged luminous flux converges toward the converging position fx. However, it enters the parallelizing lens 34 before reaching the converging position fx, is converted into the substantially parallel light, and is made incident on the reflection prism 9. The substantially parallel light reflected from the reflection prism 9 is converted into the luminous flux which diverges only in the x direction by the diverging light conversion lens 35, and then is emitted in the form of the substantially parallel light by subsequently passing through the diverging angle changing lens 11. The reflection prism 9 is arranged so that the projected image of the converged luminous flux on the reflecting surface 9a is formed with little lacking while the projected image being in contact with the apex 9t of the reflection prism 9 in the same manner as the first embodiment.

Figure 10A:
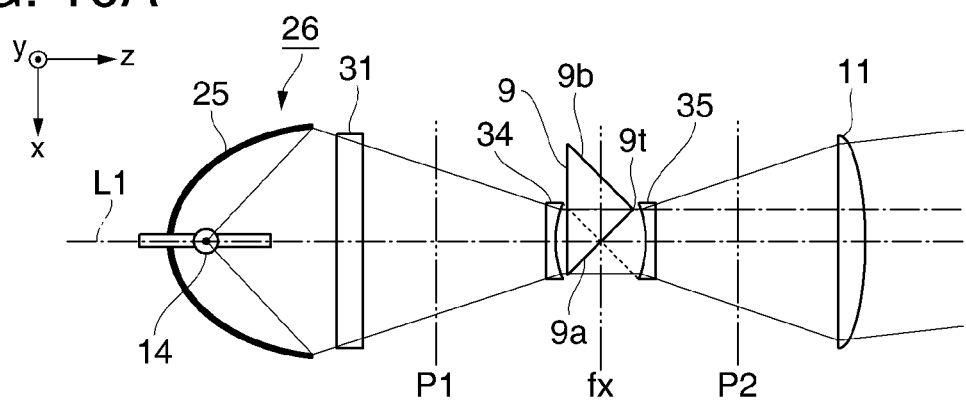
FIGS. 10A and 10B are explanatory drawings of a modification of the fourth embodiment of the invention.
Figure 10B:
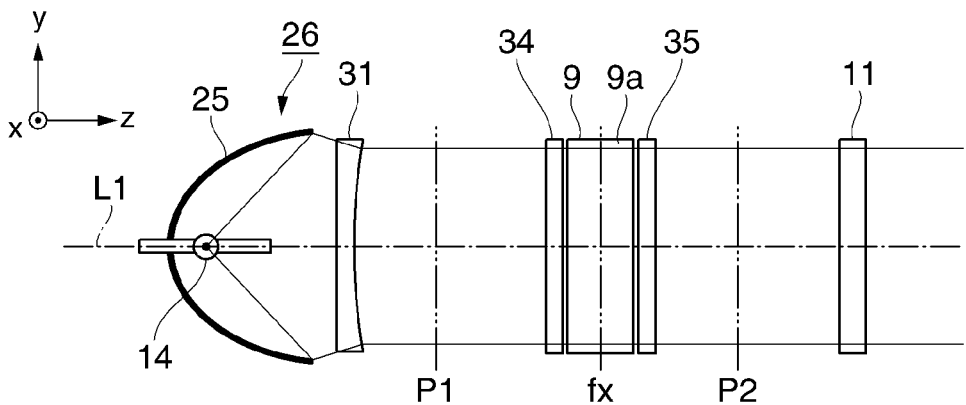

Another illumination apparatus according to the fourth embodiment shown in FIGS. 10A and 10B has the light source unit 26 having the oval reflector 25. The converged luminous flux emitted from the light source unit 26 enters the condensing angle changing lens 31 as the cylindrical lens having the concave surface. The condensing angle changing lens 31 has a curvature only in the y direction, and converts the converged luminous flux entering thereto into the substantially parallel light in the y direction, thereby converting the same into the converged luminous flux condensed only in the x direction.

Subsequently, as the configuration shown in FIGS. 9A and 9B described above, the substantially parallel light converged in the x direction is made incident on the reflection prism 9 by passing through the parallelizing lens 34, and is emitted in the form of the substantially parallel light enlarged in the x direction than the substantially parallel light emitted from the reflection prism 9 by passing through the diverging light conversion lens 35 and the diverging angle changing lens 11.

According to the illumination apparatus in the fourth embodiment as well, since the light incident on the reflection prism 9 is converged in the x direction, the same effect as the illumination apparatus according to the first embodiment in which the combined light having a small luminous flux diameter and a narrow divergence of the angular distribution is efficiently obtained, and a high light output is provided stably over a long period with a high durability is achieved. According to the fourth embodiment, since the light incident on the reflection prism 9 is the substantially parallel light, the range of the incident angle of the light incident on the reflecting surface 9a can be reduced, so that the reflectance ratio on the reflecting surface 9a is improved. In addition, since the reflection prism 9 can be arranged without limiting to a position defined on the basis of the converging position fx, the arrangement flexibility of the reflection prism 9 is improved, and the illumination apparatus having a high design flexibility is achieved.

In the fourth embodiment, the cylindrical lens is employed as the parallelizing lens 34 and the diverging light conversion lens 35. However, the invention is not limited thereto. For example, when the condensing angle changing lens is the toric lens having the toric surface, a parallelizing lens and a diverging angle changing lens having a different curvature in the same direction as the condensing angle changing lens may be used as lenses corresponding to the parallelizing lens 34 and the diverging light conversion lens 35.

Fifth Embodiment

Figure 11:
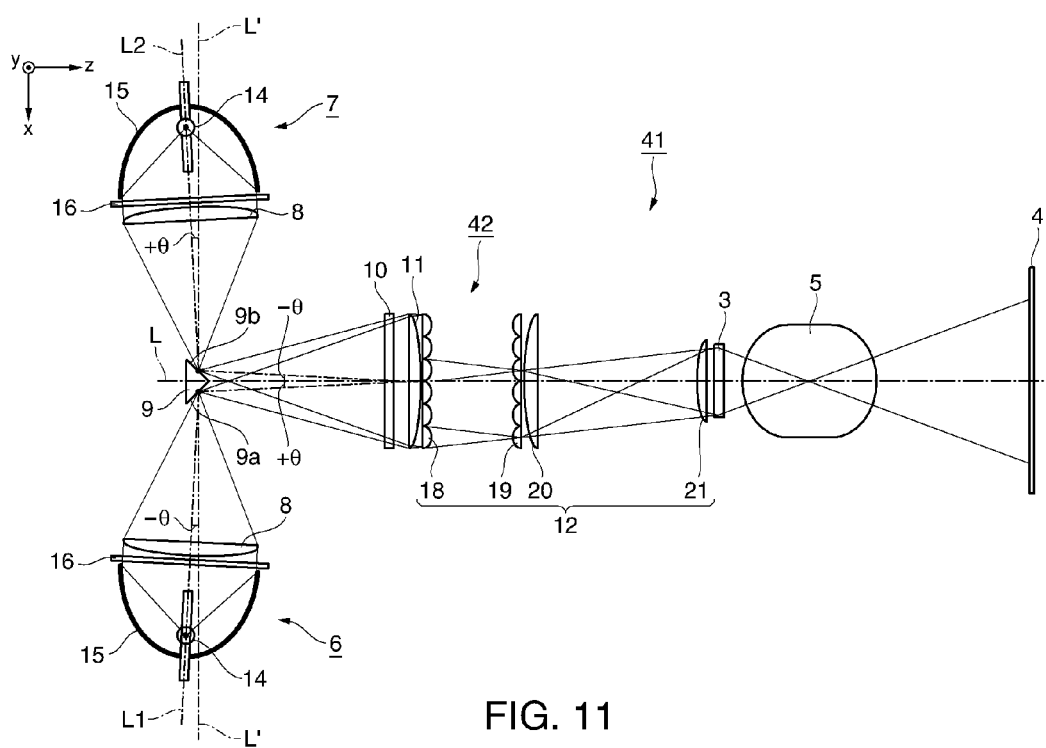
FIG. 11 is a schematic configuration drawing of a projector according to a fifth embodiment of the invention.
Figure 12B:
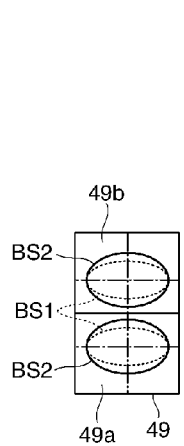
FIGS. 12A and 12B are explanatory drawings of a modification of the fifth embodiment of the invention.
Figure 12A:
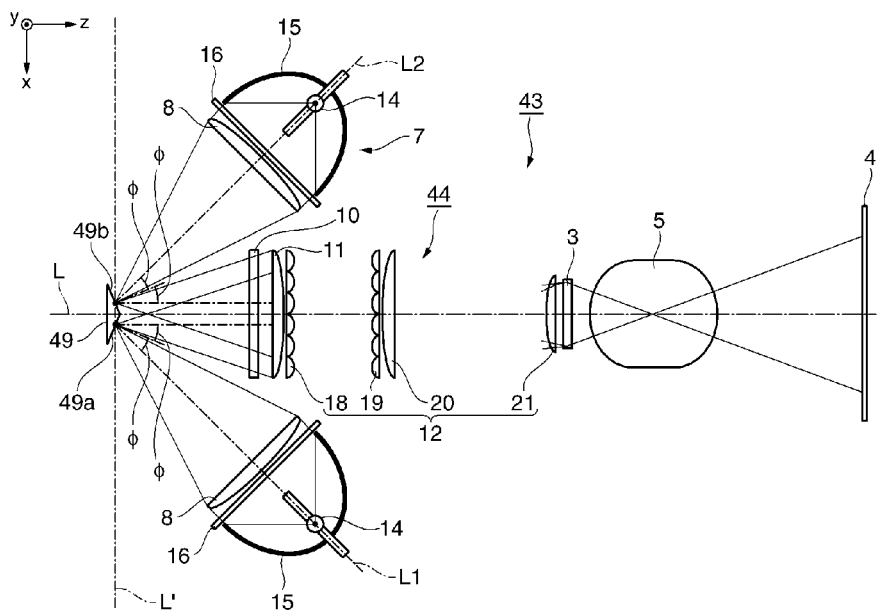

Referring now to FIGS. 11 and 12A and 12B, a fifth embodiment of the invention will be described.

The illumination apparatus in the fifth embodiment is the same as that in the first embodiment in the basic structure, and is different only in the arrangement of the light source unit with respect to the reflection prism.

FIG. 11 is a schematic configuration drawing of a projector 41 provided with the illumination apparatus in the fifth embodiment, and FIGS. 12A and 12B are schematic configuration drawings of a projector 43 having the illumination apparatus in another example of the fifth embodiment.

In FIGS. 11 and 12A and 12B, common components as those in FIG. 1 are designated by the same signs and detailed description will be omitted.

The illumination apparatus 2 in the first embodiment has the configuration in which the lamp optical axes L1 and L2 are bent by substantially 90° at the reflecting surfaces 9a and 9b of the reflection prism 9 and then the two lamp optical axes L1 and L2 are arranged substantially in parallel with the illumination optical axis L. In contrast, an illumination apparatus 42 in the fifth embodiment shown in FIG. 11 includes the first and second light source units 6 and 7 arranged in such a manner that an angle formed between the lamp optical axis L1 of the first light source unit 6 and the illumination optical axis L becomes +θ, and an angle formed between the lamp optical axis L2 of the second light source unit 7 and the illumination optical axis L becomes −θ. In a configuration in FIG. 11, the reflection prism 9 having the reflecting surfaces 9a and 9b forming an angle of 45° with respect to the illumination optical axis L is employed as in the first embodiment, and the first and second light source units 6 and 7 are arranged in such a manner that the lamp optical axis L1 of the first light source unit 6 forms an angle of −θ and the lamp optical axis L2 of the second light source unit 7 forms an angle of +θ with respect to an axis L' which extends orthogonally to the illumination optical axis L.

According to the illumination apparatus 42 in the fifth embodiment as well, the same effect as the illumination apparatus according to the first embodiment in which the combined luminous flux having a small luminous flux diameter and a narrow divergence of the angular distribution is efficiently obtained, and a high light output is provided stably over a long period with a high durability is achieved. In addition, by changing the angles of the reflecting surfaces 9a and 9b of the reflection prism 9 with respect to the illumination optical axis L and setting the same to given angles other than 45°, the two light source units 6 and 7 can be arranged at given positions on the xz plane, and the flexibility in the design of the illumination apparatus is improved.

For example, in the case of an illumination apparatus 44 shown in FIG. 12A, a reflection prism 49 having reflecting surfaces 49a and 49b forming an angle larger than 45° with respect to the illumination optical axis L is used. The first light source unit 6 and the second light source unit 7 are arranged in such a manner that an incident angles φ to the reflecting surfaces 49a and 49b (angles formed between normal lines to the reflecting surfaces 49a and 49b and the lamp optical axes L1 and L2) becomes an angle smaller than 45° and, after having reflected from the reflecting surfaces 49a and 49b, the lamp optical axis L1 and the lamp optical axis L2 extend substantially in parallel to the illumination optical axis L.

In this manner, with the configuration in which the reflecting surfaces 49a and 49b of the reflection prism 49 form a large angle with respect to the illumination optical axis L, in other words, in which an apex angle of the reflection prism 9 having a triangle prism becomes an obtuse angle, the two light source units 6 and 7 can be arranged on the side of the illumination target with respect to the axis L' which passes the reflection prism 49 and extends orthogonally to the illumination optical axis L. In this configuration, the incident angles of the converged luminous fluxes from the respective light source units 6 and 7 incident on the reflecting surfaces 49a and 49b of the reflection prism 49 may be reduced, so that the enlargement of the diameters of the luminous fluxes incident on the reflecting surfaces 49a and 49b (the widening of the projected image) can be restrained. More specifically, when the angles of the lamp optical axes L1 and L2 of the respective light source units 6 and 7 formed with respect to the normal line to the reflecting surfaces 49a and 49b are designated by the incident angle $\phi$, within the plane of incidence, the dimensions of the projected images of the luminous fluxes formed on the reflecting surfaces 49a and 49b are each $1/\cos\phi$ of the dimensions of the cross section of the luminous flux, so that the smaller the incident angle $\phi$, the more reduced the dimensions of the cross section of the luminous flux.

FIG. 12B is a drawing showing the reflection prism 9 viewed from a direction of emission of the reflecting light (z direction), and is a pattern diagram showing the cross-sectional shapes of the luminous fluxes immediately before being made incident on the reflecting surfaces (designated by reference sign BS1 and shown by broken lines), and the cross-sectional shapes of the luminous fluxes on the reflecting surfaces 49a and 49b (designated by reference sign BS2 and shown by solid lines). When the luminous fluxes are applied on the reflecting surfaces 49a and 49b obliquely, the luminous flux diameter is expanded in the direction of inclination and the luminous flux diameter is enlarged. However, when the incident angle $\phi$ is small as in the case of the illumination apparatus 44, the expansion of the luminous flux diameter as described above is alleviated, so that the luminous flux diameter of the projected image can be reduced.

According to the illumination apparatus 44 as described above, in addition to the same effects as in the illumination apparatus according to the first embodiment, since the luminous fluxes emitted from the respective light source units 6 and 7 can be reflected at close positions to an apex 49t of the reflection prism 49, the luminous flux diameter and the divergence of the angular distribution of the combined luminous flux may be reduced. In addition, the dimension of the depth of the illumination apparatus can be reduced, so that the apparatus is downsized.

In all of the embodiments describe above, the two lamp optical axes L1 and L2 are both set to be parallel to the illumination optical axis L from the reflection prism 9 onward (the side of the projection optical system 5). However, like the illumination apparatus 42 in the fifth embodiment, it is also applicable to set all of the lamp optical axes to intersect the illumination optical axis L at an incident end of the divergence angle changing lens or the integrator optical system. In this configuration, since the luminous flux diameter of the combined luminous flux entering the diverging angle changing lens or the integrator optical system can be further reduced in comparison with the embodiments described above. Therefore, downsizing of the optical system and the efficiency of light utilization in the optical system from the integrator optical system onward are improved.

Sixth Embodiment

Referring now to FIGS. 13 and 14A to 14C, a sixth embodiment of the invention will be described.

The illumination apparatus in the sixth embodiment is the same as that in the first embodiment in the basic structure, and is different only in that the polarization conversion system is added to the illumination apparatus.

Figure 13:
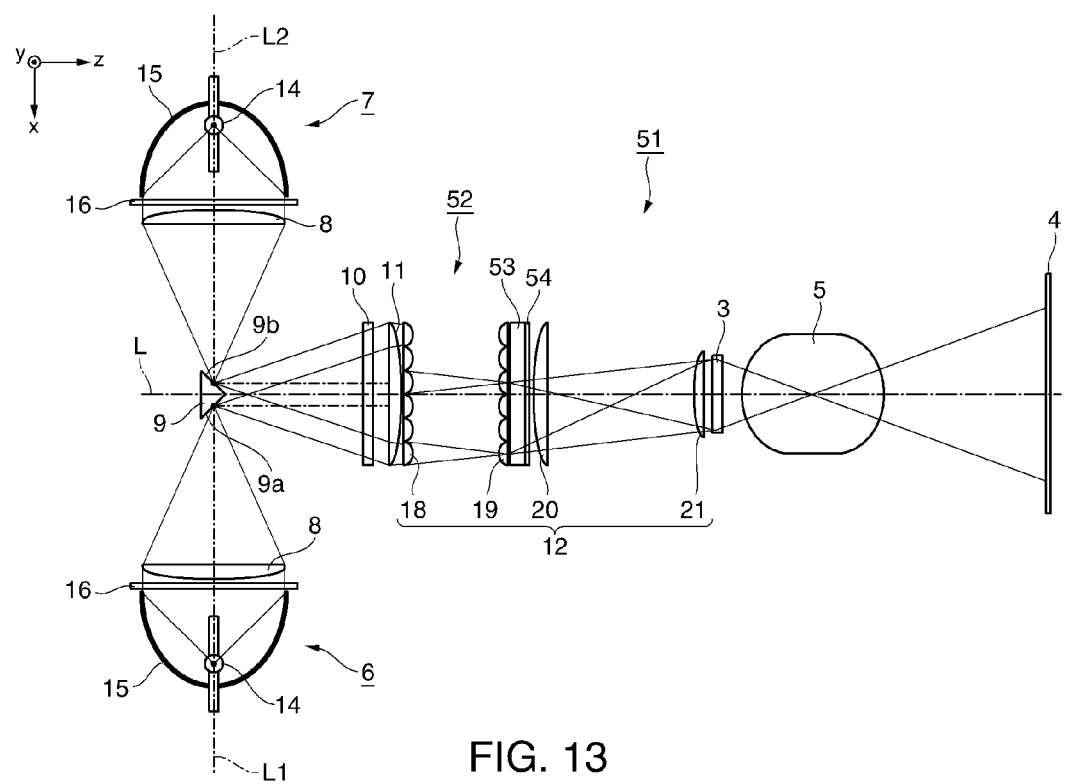
FIG. 13 is a schematic configuration drawing of a projector according to a sixth embodiment of the invention.
Figure 14A:
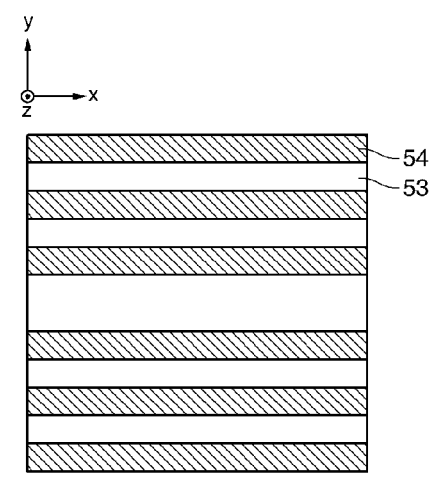
FIGS. 14A to 14C are drawings showing a PBS array and a ½ wavelength plate array which constitute a polarization conversion optical system.
Figure 14B:
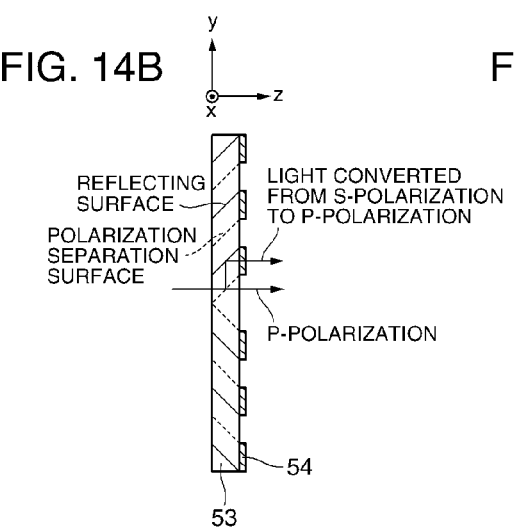
Figure 14C:
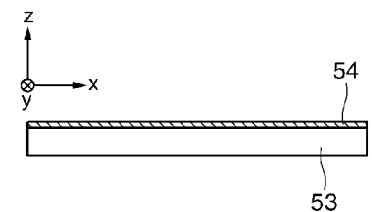

FIG. 13 is a schematic configuration drawing of a projector 51 provided with the illumination apparatus according to the sixth embodiment. FIGS. 14A to 14C are drawings showing a PBS array and a ½ wavelength plate array which constitute the polarization conversion optical system of the illumination apparatus according the sixth embodiment.

In FIG. 13, common components as those in FIG. 1 are designated by the same signs and detailed description will be omitted.

An illumination apparatus 52 in the sixth embodiment includes a polarization conversion optical system 55 made up of a polarization separation prism array 53 (hereinafter referred to as the PBS array), and a ½ wavelength plate array 54 between the lens array 19 and the superimposed lens 20 as shown in FIG. 13. As shown in FIGS. 14A to 14C, the direction in which a pair of polarization separation surfaces and a reflecting surface are arranged in the PBS array 53, that is, the direction of the polarization separation is set to be a direction (y direction) orthogonal to an xz plane in which the two light source units 6 and 7 are arranged (the direction in which the luminous fluxes from the respective light source units 6 and 7 are combined). The combined luminous flux passing through the two diverging angle changing lenses 10 and the two lens arrays 18 and 19 is converted into a polarized luminous flux of substantially one type by the polarization conversion optical system 55, and enters the light-modulating element 3 as the illumination target. In particular, when the liquid crystal display element which needs to handle the polarized light at the time of displaying images is used as the light-modulating element 3, employment of the polarization conversion optical system 55 is effective in a point that the efficiency of light utilization is improved.

According to the illumination apparatus 52 in the sixth embodiment as well, the same effect as the illumination apparatus according to the first embodiment in which the combined luminous flux having a small luminous flux diameter and a narrow divergence of the angular distribution is efficiently obtained, and a high light output is provided stably over a long period with a high durability is achieved.

Incidentally, the polarization conversion optical system 55 employing the PBS array 53 spatially separates the respective partial luminous fluxes generated by the two lens arrays 18 and 19 depending on the difference of the direction of polarization, and generates two types of polarized partial luminous fluxes different in a polarized state. In the illumination apparatus 52 in the sixth embodiment, the two partial luminous fluxes corresponding to the two light source units 6 and 7 are formed in sequence in the direction in which these luminous fluxes are combined. Therefore, as described above, by setting the direction of polarization separation in the PBS array 53 to a direction orthogonal to the direction in which the luminous fluxes are combined, the polarized partial luminous fluxes generated by performing the polarization separation from the partial luminous fluxes generated according to the number of the light source units can be arranged close to each other. Accordingly, the incident efficiency of the luminous flux into the ½ wavelength plate array 54 is enhanced, so that the high polarization conversion efficiency is realized.

Seventh Embodiment

Referring now to FIGS. 15A to 15C and 16A and 16B, a seventh embodiment of the invention will be described.

The illumination apparatus in the seventh embodiment is the same as those in the first embodiment and the second embodiment in the basic structure, and is different only in that the illumination apparatus is not provided with the condensing angle changing lens.

Figure 16A:
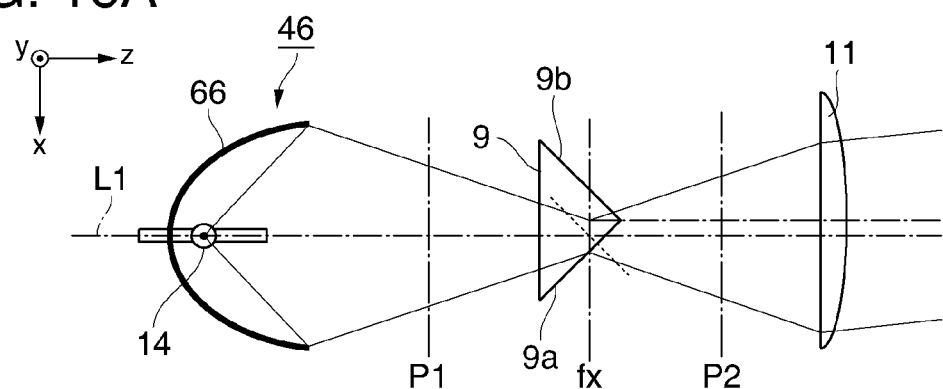
FIGS. 16A and 16B are explanatory drawings of a modification of a seventh embodiment of the invention.
Figure 16B:
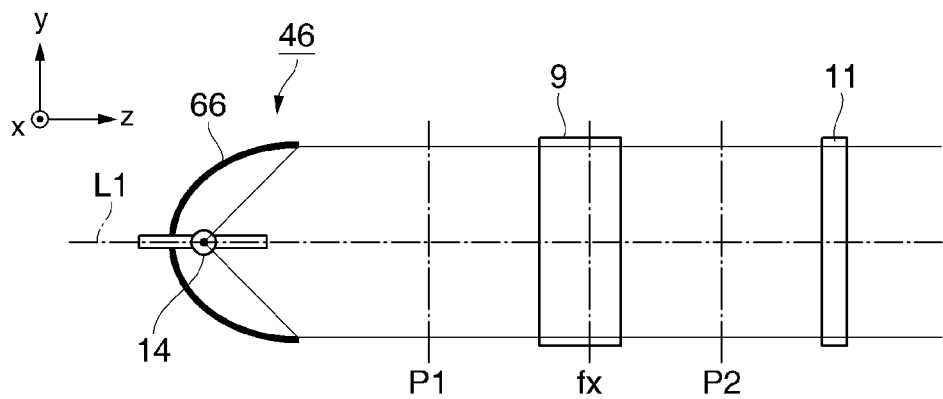

FIG. 15A is a schematic configuration drawing of a projector 61 provided with the illumination apparatus according to the seventh embodiment. FIG. 15B is a perspective view of a reflector used in the illumination apparatus, and FIG. 15C is a drawing schematically showing a cross-sectional shape of the reflector. FIGS. 16A and 16B correspond to FIGS. 3A to 3F used for the description of the illumination apparatus in the first embodiment described above.

In FIGS. 15A to 15C and 16A and 16B, common components as those in FIG. 1 are designated by the same signs and detailed description will be omitted.

In contrast to the illumination apparatus according to the first embodiment, an illumination apparatus 62 in the seventh embodiment shown in FIGS. 15A to 15C does not have the condensing angle changing lens 8 to which the lights emitted from respective light source units 36 and 37 enter, and is configured in such a manner that the lights emitted from the UV and IR cut filters 16 are made incident directly on the reflecting surfaces 9*a* and 9*b* of the reflection prism 9 as shown in FIG. 15A. A reflector 65 in the seventh embodiment shown in FIG. 15B is a oval reflector configured to emit a light in the x direction. As shown in FIG. 15C, a cross-sectional shape 65*xz* in an xz plane and a cross-sectional shape 65*xy* in an xy plane of the reflector 65 are different, and the radius of curvature of in the xz plane is larger than that in the xy plane. The reflector 65 in this configuration functions in the same manner as the condensing angle changing lens 8 in the first embodiment, and generates a converged luminous flux having condensing angles different in two directions orthogonal to the lamp optical axes L1 and L2 with respect to each other.

In other words, in the z direction and in the y direction orthogonal to the lamp optical axes L1 and L2 with respect to each other, the converged luminous fluxes emitted from the two light source units 36 and 37 each have the condensing angle in the z direction smaller than the condensing angle in the y direction. Therefore, the converged luminous fluxes are minimized in diameter in the y direction on the side of the light source units 36 and 37 with respect to the reflecting surfaces 9*a* and 9*b* of the reflection prism 9, and are then made incident on the reflecting surfaces 9*a* and 9*b* in a state larger than the minimum diameter. In contrast, the converged luminous fluxes are made incident on the reflecting surfaces 9*a* and 9*b* in the state of being minimized in diameter in the z direction. Therefore, the intensity of the luminous fluxes incident on the reflecting surfaces 9*a* and 9*b* per unit area can be reduced without lowering the combining efficiency when the luminous fluxes from the two light source units 36 and 37 are combined.

According to the illumination apparatus in another example of the seventh embodiment shown in FIGS. 16A and 16B, a reflector 66 of a light source unit 46 is formed into an oval shape in cross section taken along an xz plane passing through the lamp optical axis L1, and the cross-sectional shape in a yz plane passing through the lamp optical axis L1 is a paraboloid shape. Therefore, the converged luminous flux emitted from the light source unit 46 is converged only in the x direction at the converging position fx.

In other words, the converged luminous fluxes are made incident on the reflecting surfaces 9*a* and 9*b* in a state in which the diameters of the luminous fluxes in the x direction are minimized. In contrast, the converged luminous fluxes are made incident on the reflecting surfaces 9*a* and 9*b* still in the form of the substantially parallel light without being changed in diameter in the y direction from the state immediately after having emitted from the light source unit 46. Therefore, the intensity of the luminous fluxes incident on the reflecting surfaces 9*a* and 9*b* per unit area can be reduced without lowering the combining efficiency when the luminous fluxes from the two light source units are combined.

The converged luminous flux as described above enters the diverging angle changing lens 11 after having reflected from the reflecting surface 9*a*. The diverging angle changing lens 11 here is a cylindrical lens having a curvature only in the x direction. Therefore, the converged luminous flux entering the diverging angle changing lens 11 is converted into the substantially parallel light by passing through the diverging angle changing lens 11 and emitted therefrom.

According to the illumination apparatus as described above as well, the same effect as the illumination apparatus according to the first embodiment in which the combined luminous flux having a small luminous flux diameter and a narrow divergence of the angular distribution is efficiently obtained, and a high light output is provided stably over a long period with a high durability is achieved. Furthermore, the condensing angle changing lens 8 is not needed and hence reduction of the number of components is achieved in the seventh embodiment.

Eighth Embodiment

Referring now to FIGS. 17 to 20, an eighth embodiment of the invention will be described.

The illumination apparatus in the eighth embodiment is the same as that in the first embodiment in the basic structure, and is different only in that a reflection unit 89 made up of two reflection mirrors is provided instead of the reflection prism.

Figure 17:
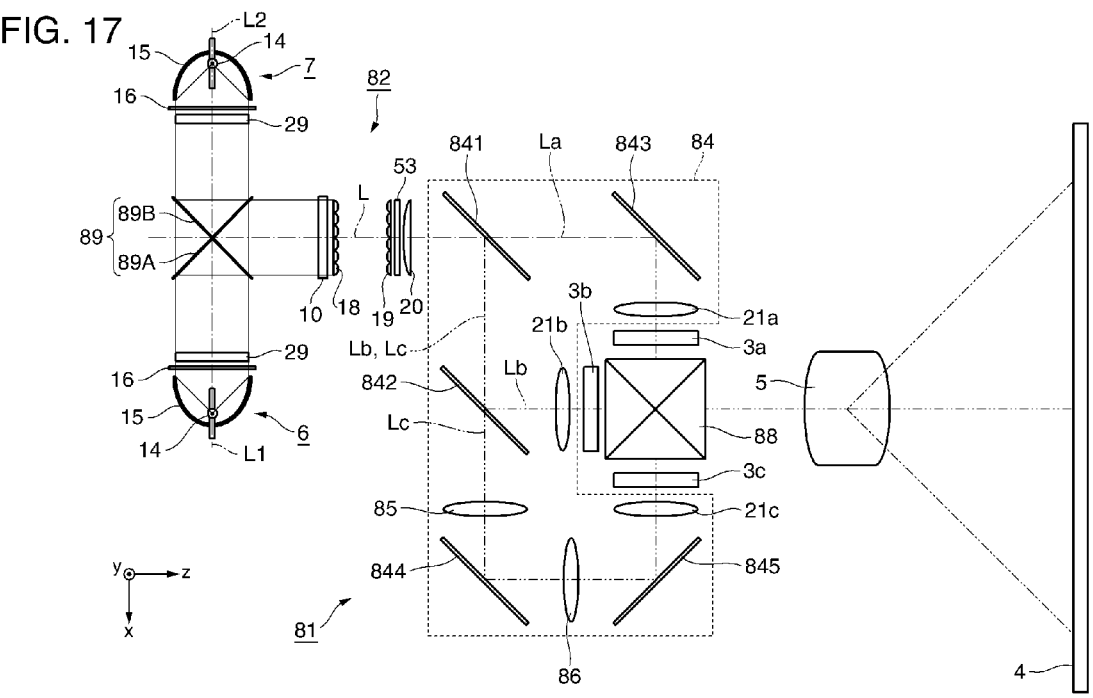
FIG. 17 is a schematic configuration drawing of a projector according to an eighth embodiment of the invention.
Figure 18:
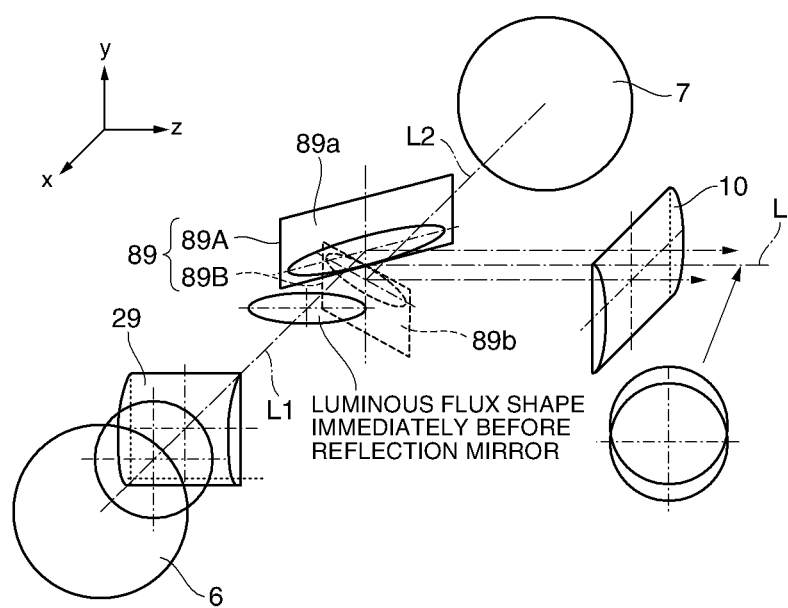
FIG. 18 is a perspective view showing a mode of change in cross-sectional shape of a luminous flux from the light source lamp in the projector according to the eighth embodiment of the invention.
Figure 19:
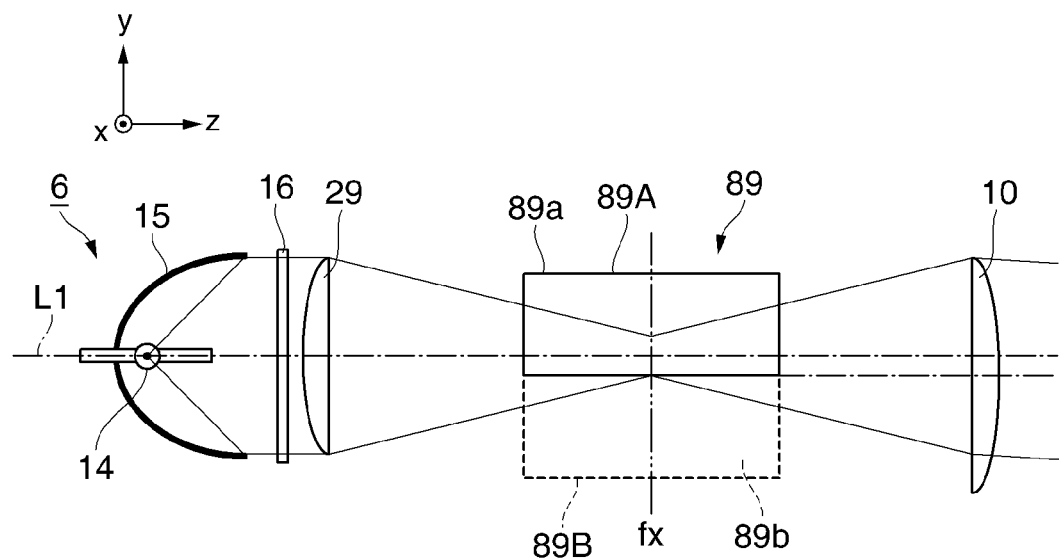
FIG. 19 is an explanatory drawing showing an action of the condensing angle changing lens and the diverging angle changing lens used in the projector according to the eighth embodiment of the invention.
Figure 20:
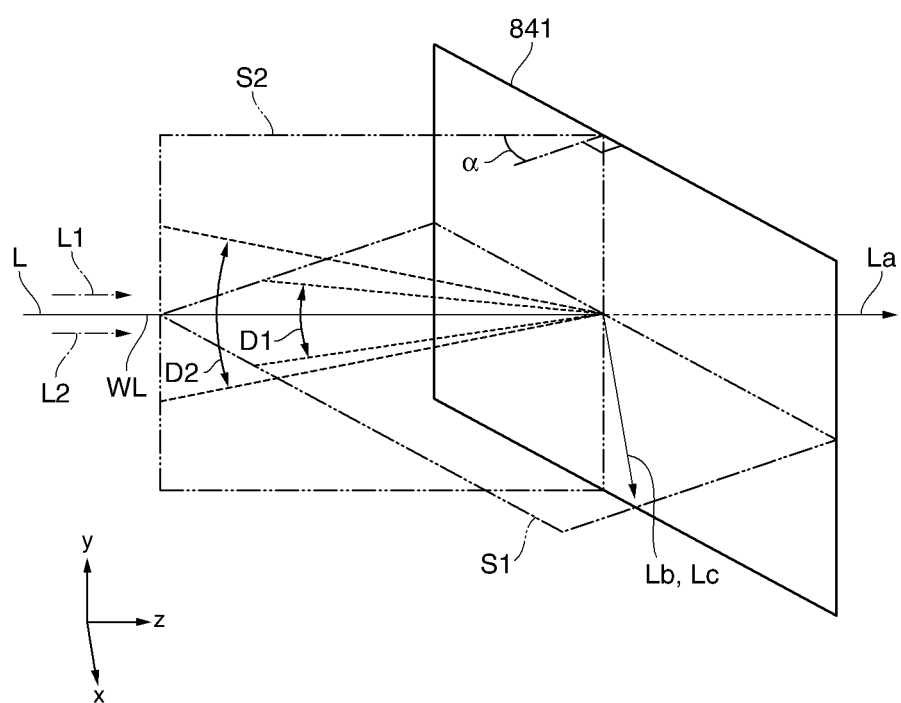
FIG. 20 is an explanatory drawing of the projector according to the eighth embodiment of the invention.

FIG. 17 is a schematic configuration drawing of a projector 81 provided with the illumination apparatus according to the eighth embodiment. FIG. 18 is a perspective view showing schematically a mode of change in cross-sectional shape of a luminous flux from light source units. FIG. 19 is an explanatory drawing showing actions of a condensing angle changing lens and a diverging angle changing lens used in the projector. FIG. 20 is an explanatory drawing for explaining an operation of the projector 81 according to the eighth embodiment.

In FIGS. 17 and 19, components already described are designated by already described reference numerals and detailed description will be omitted.

As shown in FIG. 17, the projector 81 in the eighth embodiment is so-called a three-panel type projector having three light-modulating elements in contrast to the embodiments described above. The projector 81 is operated as follows in brief.

A light emitted from an illumination apparatus 82 is separated into a plurality of colored lights by a color separating optical system 84. The plurality of colored lights separated by the color separating optical system 84 enter corresponding light-modulating elements 3*a* to 3*c* and are modulated therein. The plurality of colored lights modulated by the light-modulating elements 3*a* to 3*c* enter a color combining element 88 and are combined therein. The light combined by the color combining element 88 is projected on the screen 4 by the projection optical system 5 in an enlarged scale, and a full-color projected image is displayed. Respective components of the projector 81 will be described below.

The reflection unit 89 of the illumination apparatus includes a reflection mirror 89A and a reflection mirror 89B. The respective reflection mirrors 89A and 89B form an angle of substantially 45° with respect to the illumination optical axis L respective and are arranged to straddle the illumination optical axis L so as to be superimposed in an X-shape when viewed in the direction of the normal line to an xz plane. The substantially parallel lights emitted from the respective light source units 6 and 7 are reflected from the reflection mirrors 89A and 89B respectively, and enter the color separating optical system 84.

The color separating optical system 84 includes dichroic mirrors 841 and 842, mirrors 843 to 845, parallelizing lenses 21a to 21c, and relay lenses (relay optical system) 85 and 86. The dichroic mirrors 841 and 842 are formed, for example, by laminating dielectric multilayer films on the surface of a glass. The dichroic mirrors 841 and 842 have a feature to selectively reflect the colored light in a predetermined wavelength band and allow passage of colored lights having other wavelength bands therethrough. In this case, the dichroic mirror 841 reflects a green light and a blue light, and the dichroic mirror 842 reflects the green light.

The combined luminous flux emitted from the illumination apparatus 82 enters the dichroic mirror 841. A red light La in the combined luminous flux passes through the dichroic mirror 841, is made incident on the mirror 843, and is reflected from the mirror 843 and enters the parallelizing lens 21a. The red light La enters the light-modulating element 3a after having substantially parallelized by the parallelizing lens 21a.

A green light Lb and a blue light Lc in the combined luminous flux are reflected from the dichroic mirror 841 and enter the dichroic mirror 842. The green light Lb reflects from the dichroic mirror 842 and enters the parallelizing lens 21b. The green light Lb enters the light-modulating element 3b after having substantially parallelized by the parallelizing lens 21b.

The blue light Lc passed through the dichroic mirror 842 passes through the relay lens 85 and is reflected from the mirror 844, then passes through the relay lens 86 and is reflected from the mirror 845 and then enters the parallelizing lens 21c. The blue light Lc enters the light-modulating element 3c after having substantially parallelized by the parallelizing lens 21c.

The light-modulating elements 3a to 3c are made up, for example, of light-modulating devices such as transmissive liquid crystal light valves. The light-modulating elements 3a to 3c are electrically connected to a signal source (not shown) such as a PC for supplying image signals including image data. The light-modulating elements 3a to 3c form an image by modulating the incident light from pixel to pixel on the basis of the supplied image signals. The light-modulating elements 3a to 3c form a red image, a green image, and a blue image, respectively. The light (images) modulated (formed) by the light-modulating elements 3a to 3c enter the color combining element 88.

The color combining element 88 is made up of a dichroic prism or the like. The dichroic prism has a configuration including four triangular prisms bonded to each other. Surfaces to be bonded of the triangle prism correspond to inner surfaces of the dichroic prism. A mirror surface which reflects the red light and allow passage of the green light and a mirror surface which reflects the blue light and allows passage of the green light are formed on the inner surfaces of the dichroic prism so as to be orthogonal to each other. The green light entering the dichroic prism is emitted as is through the mirror surface. The red light and the blue light entering the dichroic prism are selectively reflected from or pass through the mirror surface, and are emitted in the same direction as the direction of emission of the green light. The three colored light (images) are superimposed and combined in this manner, and the combined colored light is projected on the screen 4 by the projection optical system 5 in an enlarged scale.

As shown in FIG. 18, the first light source unit 6 and the second light source unit 7 are arranged at different positions in the y direction so that the lamp optical axis L1 and the lamp optical axis L2 are present in two planes (xz planes) different in the y direction. The substantially parallel lights emitted from the respective light source units 6 and 7 pass through the condensing angle changing lens 29 as the cylindrical lens having a curvature only in the y direction, thereby being converted into the converged luminous flux condensed in the y direction and being made incident on the reflection unit 89. The converged luminous flux reflected from the reflection unit 89 passes through the diverging angle changing lens 10 as the cylindrical lens having a curvature only in the y direction, thereby being converted into the substantially parallel light and emitted therefrom as the combined luminous flux.

The converged luminous fluxes to be made incident on the reflection unit 89 are made incident on reflecting surfaces 89a and 89b of the respective reflection mirrors 89A and 89B after straddling the illumination optical axis L when viewed in the direction of the normal line to the xz plane. The converged luminous flux is at this time made incident on a position where the lamp optical axis L1 and the lamp optical axis L2 reflected from the reflecting surfaces 89a and 89b overlap with the illumination optical axis L when viewed in the direction of the normal line to the xz plane.

In addition, as shown in FIG. 19, the converged luminous flux emitted from the first light source unit 6 is applied to the reflection mirror 89A at a position shifted to the side of the adjacent reflection mirror 89B so that the converged luminous flux comes into contact with an end of the reflection mirror 89A. In the same manner, the converged luminous flux emitted from the second light source unit, not shown, is applied to the reflection mirror 89B at a position shifted to the side of the adjacent reflection mirror 89A in the same manner. By applying the converged luminous flux in this manner, the combined luminous flux is formed in a state in which the lamp optical axes L1 and L2 are in proximity in the y direction.

As describe above, since the two lamp optical axes L1 and L2 corresponding to the two light source units 6 and 7 are arranged in a yz plane at different positions in the y direction, the direction in which the luminous fluxes are combined is the y direction included in the yz plane. Therefore, in the illumination apparatus 82 in the eighth embodiment, the direction of the polarization separation in the PBS array 53 is set to the x direction, which is the direction orthogonal to the direction in which the luminous fluxes are combined.

FIG. 20 is an explanatory drawing showing a state of the combined luminous flux described above (white light WL) entering the dichroic mirror 841. As shown in FIG. 20, when the white light WL enters the dichroic mirror 841 at an angle α, the lamp optical axes L1 and L2 of the light source units, not shown, are orthogonal to a plane of incidence S1 with respect to the dichroic mirror 841 and are positioned so as to be included in an imaginary plane S2 including the illumination optical axis L. Therefore, the combined luminous flux has a divergence of the angular distribution in the imaginary plane S2. The plane of incidence S1 shown in FIG. 20 is a plane including the lamp optical axis L1 which is reflected and bent from the dichroic mirror 841.

It is known that the dichroic mirror 841 has an angle dependency such that a capability to separate a light is significantly affected by an incident angle of the light. The reason is that the distance of passage of the light within the dielectric layer changes when the incident angle changes, and hence the extent of the effect of the dielectric layer on the light changes correspondingly.

As indicated by a reference sign D1 in FIG. 20, when the combined luminous flux has a divergence of the angular distribution in the plane of incidence S1, the incident angle with respect to the dichroic mirror 841 changes significantly within a range of the divergence. Since the separation wavelength by the dichroic mirror 841 then changes according to the incident angle, the combined luminous flux has a threshold value with a wide wavelength correspondingly, so that color nonuniformity tends to occur.

In contrast, as indicated by a reference sign D2 in FIG. 20, when the combined luminous flux has a divergence of the angular distribution within the imaginary plane S2, there is no significant difference in incident angle with respect to the dichroic mirror 841 within the range of the divergence. It is because that there is little change in distance of passage of the light (component in the direction of the plane of incidence S1) within the dielectric layer. Therefore, even when the incident angle changes within the range of the divergence of the angular distribution, the separation wavelength by the dichroic mirror 841 can hardly be changed, so that the color nonuniformity can hardly occur.

Therefore, when the combined luminous flux entering the dichroic mirror 841 has the divergence of the angular distribution as described above, the occurrence of the color nonuniformity can easily be restrained in comparison with, for example, a case where the divergence of the angular distribution is present in the plane of incidence S1, which is preferable.

According to the illumination apparatus 82 as described above as well, the same effect as the illumination apparatus according to the sixth embodiment in which the combined luminous flux having a small luminous flux diameter and a narrow divergence of the angular distribution is efficiently obtained, and a high light output is provided stably over a long period with a high durability is achieved. The pair of reflection mirrors 89A and 89B of the reflection unit 89 are arranged in the X-shape along the direction in which the lights emitted from the respective light source units 6 and 7 are combined. Therefore, the reflection unit 89 does not have the ridge line (apex) where the reflection mirror comes into contact in contrast to the case of the reflection prism 9 shown in the embodiments described above where the reflecting surfaces 9a and 9b are in contact with each other at the apex 9t. Therefore, for example, while the reflection prism 9 is required to be formed in such a manner that the apex 9t forms an angle of 90° and the reflecting surfaces 9a and 9b form a joined surface without being discontinued, the reflection unit 89 is not required to form the specific joined surface as such, whereby formation is simplified.

In the illumination apparatus 82 as described as well, it is also applicable to set all of the lamp optical axes to intersect the illumination optical axis L in the divergence angle changing lens or the integrator optical system as the illumination apparatus 42 in the fifth embodiment.

Ninth Embodiment

Figure 21:
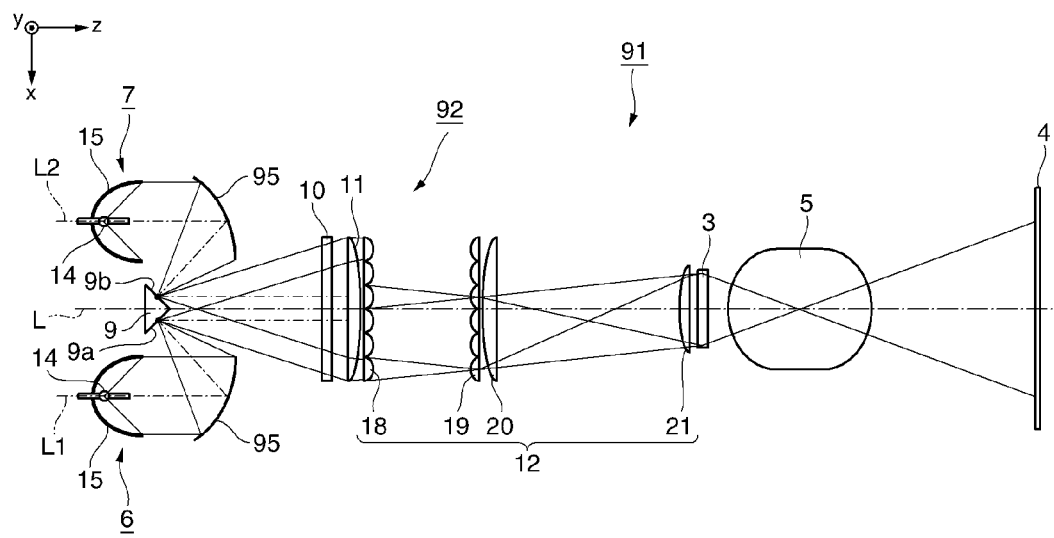
FIG. 21 is a schematic configuration drawing of a projector according to a ninth embodiment of the invention.

Referring now to FIG. 21, a ninth embodiment of the invention will be described.

The illumination apparatus in the ninth embodiment is the same as those in the first embodiment and the second embodiment in the basic structure, and is different only in that a reflection mirror in a concave shape is provided instead of the condensing angle changing lens.

FIG. 21 is a schematic configuration drawing of a projector 91 provided with the illumination apparatus according to the ninth embodiment.

In FIG. 21, common components as those in FIG. 1 are designated by the same signs and detailed description will be omitted.

As shown in FIG. 21, the substantially parallel lights emitted from the respective light source units 6 and 7 of an illumination apparatus 92 in the ninth embodiment are made incident on and reflected from reflection mirrors (condensing angle changing elements) 95 in the concave shape having different curvatures in the x direction and in the y direction, are converted into the converged luminous fluxes, and are made incident on the reflection prism 9.

According to the illumination apparatus 92 as described above as well, the same effect as the illumination apparatus according to the first embodiment in which the combined luminous flux having a small luminous flux diameter and a narrow divergence of the angle distribution is efficiently obtained, and a high light output is provided stably over a long period with a high durability is achieved. In addition, in the ninth embodiment, the mirror is employed for changing the condensing angle. Therefore, chromatic aberration does not occur in contrast to the lens, and hence the luminous flux diameter can be made smaller than the case in which the condensing angle changing lens is used. A paraboloid mirror with deviated axis or a troidal mirror formed into a toric surface may be employed as the reflection mirror 95. In such a case, occurrence of spherical aberration or astigmatism is restrained in addition to the chromatic aberration, so that the luminous flux diameter can further be reduced.

Figure 22:
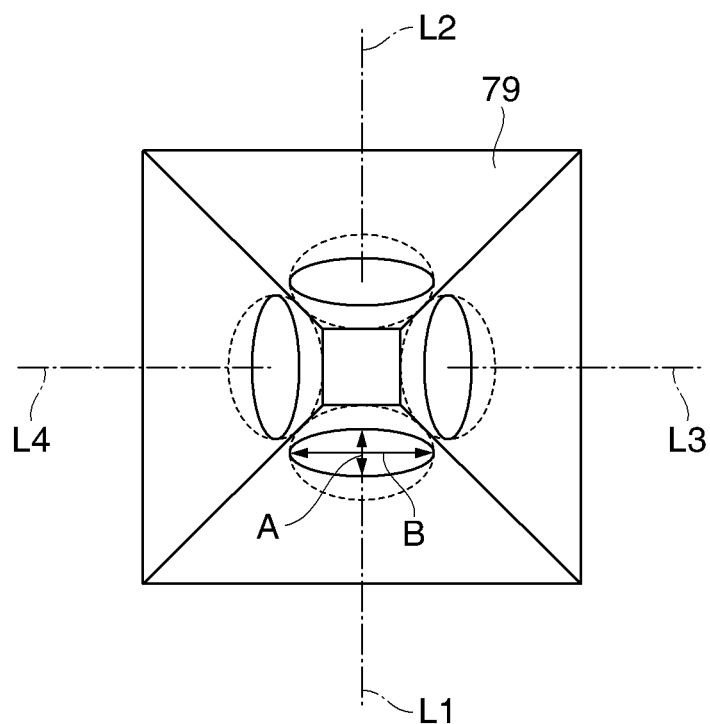
FIG. 22 is a drawing showing a reflection prism used in an illumination apparatus having four light source units.

The technical scope of the invention is not limited to the embodiments shown above, and various modifications may be made without departing the scope of the invention. For example, the example of the illumination apparatus in which the two light source units are provided has been shown in the embodiments described above. However, the number of the light source units is not limited to two, and a configuration including other numbers of, for example, four light source units is also applicable. FIG. 22 is a pattern diagram of a reflection prism 79 having a truncated pyramid shape used for the illumination apparatus having the four light source units viewed from the light emitting side. As shown in FIG. 22, what is essential in this configuration is to differentiate the condensing angles in the two directions orthogonal to each other for the lamp optical axes L1 to L4 in the each of the four light source units and generate a luminous flux having a small cross-sectional dimension in the direction of inclination (the direction indicated by an arrow A in FIG. 22) of a reflecting surface of the prism and a large cross-sectional dimension in the direction orthogonal to the direction of inclination (the direction indicated by an arrow B in FIG. 22).

In addition, an optical integrator system having a rod lens instead of the lens array system as shown in the embodiments described above may also be used as the optical integrator system which constitute a uniform illumination system. In such a case, a diverging angle changing lens having a feature to condense a diverging luminous flux (combined luminous flux) reflected from the reflecting surface of the reflection prism again is preferably used. A configuration in which the rod lens is arranged at a position where the respective luminous fluxes are condensed by the diverging angle changing lens for allowing the luminous fluxes from the respective light source units to enter the rod lens is also applicable. Alternatively, when using a rod lens having a large aperture, a configuration in which the rod lens is arranged immediately after the reflection prism instead of using the diverging angle changing lens to allow the luminous fluxes from the respective light source units to enter the rod lens is also applicable. In addition to the configurations described above, detailed configurations such as the shapes, the numbers, and the layouts of the respective members which constitute the illumination apparatus and the projector are not limited to the embodiments described above, and may be changed as needed.

Further, the reflection prism 9 is not limited to the form of the prism. What is essential is that a plurality of reflecting surfaces for reflecting the luminous fluxes from the light source units are arranged at predetermined angles. For example, a configuration in which a plurality of panel-shaped reflection mirrors are arranged at predetermined angles may also be employed. In the case of this configuration, the reflecting surfaces can be cooled from the back surface sides of the reflection mirrors, so that improvement of durability of the reflecting surfaces is easily achieved. In the embodiments described above, the reflection prism is arranged in such a manner that the cross-sectional dimensions of the luminous flux emitted from the each light source unit taken along the reflecting surface of the reflection prism is minimized in in-plane direction including the lamp optical axis and the optical axis of the luminous flux reflected from the reflecting surface. However, what is essential is to arrange the reflection prism in such a manner that the cross-sectional dimensions described above are substantially minimized.

Among the embodiments described above, the configuration of the projector of the three-panel type is employed only in the eighth embodiment. However, the illumination apparatus in other embodiments may be applied to the three-panel type projector as a matter of course. In this case, as shown in FIG. 20, the lamp optical axes L1 and L2 are preferably positioned so as to be orthogonal to the plane of incidence of the dichroic mirror of the color separating optical system, and be included in an imaginary plane including the illumination optical axis.

The entire disclosure of Japanese Patent Application Nos. 2008-326788, filed Dec. 24, 2008 and 2009-258186, filed Nov. 11, 2009 are expressly incorporated by reference herein.

What is claimed is:

1. An illumination apparatus comprising:
    a first light source unit and a second light source unit; and
    an optical axis converting element having a first reflecting surface configured to reflect a luminous flux emitted from the first light source unit and a second reflecting surface configured to reflect a luminous flux emitted from the second light source unit and being configured to reflect respective luminous fluxes emitted from the respective light source units in substantially one direction, wherein
    each of the luminous fluxes entering the optical axis converting element has different dimensions between a first and second direction in two directions which are orthogonal to each other in a plane orthogonal to an emission axis of the respective light source unit, and
    the optical axis converting element is arranged in such a manner that a cross-sectional shape of the respective luminous fluxes entering the optical axis converting element taken along the reflecting surface has a short side direction which is one of the two directions orthogonal to each other and which is in the same direction as the direction of arrangement of the first reflecting surface and the second reflecting surface.

2. The illumination apparatus according to claim 1, wherein the reflecting surface is arranged at a position where the dimension of the short side direction of the cross-sectional shape of the luminous flux incident on the corresponding optical axis converting element is substantially minimized.

3. The illumination apparatus according to claim 1, wherein the luminous flux incident on the optical axis converting element has a condensing angle in the direction orthogonal to an in-plane direction including the emission axis before and after being reflected from the reflecting surface larger than a condensing angle in the in-plane direction.

4. The illumination apparatus according to claim 1, wherein the luminous flux incident on the optical axis converting element has a condensing angle in the direction orthogonal to an in-plane direction including the emission axis before and after being reflected from the reflecting surface smaller than a condensing angle in the in-plane direction.

5. The illumination apparatus according to claim 1, comprising condensing angle changing elements provided between the respective light source units and the optical axis converting element, the condensing angle changing elements each condensing the luminous flux emitted from the each light source unit so as to have different condensing angles in two directions orthogonal to each other in a plane orthogonal to the emission axis of the each light source unit.

6. The illumination apparatus according to claim 5, wherein the condensing angle changing element is a condensing element having a toric surface.

7. The illumination apparatus according to claim 5, wherein the condensing angle changing element is a condensing element having a cylindrical surface.

8. The illumination apparatus according to claim 5, wherein the condensing angle changing element is a lens member.

9. The illumination apparatus according to claim 5, wherein the condensing angle changing element is a reflection mirror.

10. The illumination apparatus according to claim 5, wherein the each light source unit includes a light-emitting member and an oval surface reflector configured to reflect the luminous flux emitted from the light-emitting member, and
    the light-emitting member is positioned at a focal position of the oval surface reflector.

11. The illumination apparatus according to claim 1, wherein the each light source unit includes a light-emitting member and a reflector configured to reflect the luminous flux emitted from the light-emitting member, and
    the reflector condenses the luminous flux emitted from the light-emitting member so as to have different condensing angles in two directions orthogonal to each other in a plane orthogonal to the emission axis of the each light source unit.

12. The illumination apparatus according to claim 1, comprising a diverging angle changing element configured to cause the luminous flux emitted from the optical axis converting element to be emitted in such a manner that diverging angles in two directions orthogonal to each other in a plane orthogonal to an emission axis of the optical axis converting element to substantially match.

13. The illumination apparatus according to claim 1, comprising:
    a parallelizing lens configured to convert the luminous flux incident on the optical axis converting element into a parallel light and emit the same to the optical axis converting element; and a diverging light conversion element configured to convert the parallel light emitted from the optical axis converting element into a diverging light.

14. The illumination apparatus according to claim 1, wherein the first reflecting surface and the second reflecting surface are provided so as to intersect in an X-shape when viewed in the direction of arrangement of the two reflecting surfaces.

15. An illumination apparatus comprising:
a plurality of light source units having a light-emitting member; and
an optical axis converting element configured to reflect respective luminous fluxes emitted from the plurality of light source units from different reflecting surfaces in substantially one direction and emit the reflected luminous fluxes in substantially one direction as a combined luminous flux, wherein
each of the respective luminous fluxes emitted from the plurality of light source units is a converged luminous flux having condensing angles different between a first and second direction in two directions orthogonal to each other in a plane orthogonal to an emission axis of the each light source unit, and
the optical axis converting element is arranged in such a manner that the reflecting surfaces are positioned so that a dimension of a cross section of the luminous flux emitted from the respective light source unit taken in a direction along the corresponding reflecting surfaces in an in-plane including emission axes of the plurality of light source units and optical axes of the luminous fluxes reflected from the reflecting surfaces is smaller than a dimension of the cross section thereof in a direction orthogonal to the in-plane.

16. The illumination apparatus according to claim 15, wherein the reflecting surfaces are arranged at positions where the dimensions in the in-plane direction are substantially minimized.

17. A projector comprising an illumination apparatus according to claim 1, an image forming element configured to form an image by a light emitted from the illumination apparatus, and a projection optical system configured to project the light emitted from the image forming element.

18. The projector according to claim 17, comprising:
a color separating optical system configured to separate the light emitted from the illumination apparatus into a plurality of colored lights;
a plurality of the image forming elements corresponding respectively to the plurality of colored lights; and
a color combining optical system configured to combine the plurality of colored lights emitted via the plurality of image forming elements,
wherein the color separating optical system includes a wavelength separation film having a dielectric multilayer film, and
emission axes of two light source units of the illumination apparatus are arranged in a direction orthogonal to an in-plane direction including the emission axes before and after going through the wavelength separation films.

* * * * *